United States Patent [19] [11] Patent Number: 4,496,287
Nelson et al. [45] Date of Patent: Jan. 29, 1985

[54] SENSORS FOR DETECTION OF FLUID CONDITION, AND CONTROL SYSTEMS UTILIZING THEIR SIGNALS

[75] Inventors: Robert M. Nelson, Willow Springs Village, Rte. 1, Box 215, Rosamond, Calif. 93560; Robert E. Nelson, Rosamond, Calif.

[73] Assignee: Robert M. Nelson, Rosamond, Calif.

[21] Appl. No.: 387,417

[22] Filed: Jun. 11, 1982

Related U.S. Application Data

[62] Division of Ser. No. 121,463, Feb. 14, 1980.

[51] Int. Cl.³ .......................... F04B 21/00; G01N 7/00
[52] U.S. Cl. ..................................... 417/63; 417/417;
73/19; 73/56; 73/61 R; 73/64.2
[58] Field of Search .................. 137/554; 417/63, 417,
417/418; 73/19, 56, 61 R, 64.2, 744, 745

[56] References Cited

U.S. PATENT DOCUMENTS

| 458,873 | 9/1891 | Van Depoele | 417/418 |
| 2,669,186 | 2/1954 | Parker | 417/418 |
| 3,282,220 | 11/1966 | Inman | 417/418 |
| 3,625,050 | 7/1969 | Noetzal et al. | 73/56 |
| 3,758,776 | 9/1973 | Frohne et al. | 73/56 |
| 3,841,147 | 10/1974 | Coil et al. | 73/56 |
| 4,255,088 | 3/1981 | Newton et al. | 73/19 |
| 4,309,153 | 1/1982 | Panick et al. | 417/418 |

Primary Examiner—Alan Cohan
Assistant Examiner—John A. Rivell
Attorney, Agent, or Firm—Donald D. Mon

[57] ABSTRACT

A sensor utilizes the opposition of a fluid to physical displacement to provide information about the fluid itself, such as its quality as measured by its density or viscosity, or about the state of a fluid system which contains it, such as the fluid pressure existing at some point in the system. The sensor includes a fluid displacement device or element physically adapted to displace the fluid and repetitively urged into displacement by the application of a known impetus or urging force. The resulting motion of the element is then analyzed to obtain the information desired. The fluid displacement element may additionally perform a pumping function, or it may operate in a fluid stream externally powered. When employed as a pump, the sensor may provide information on the fluid pumped or on the state of the fluid system.

8 Claims, 30 Drawing Figures

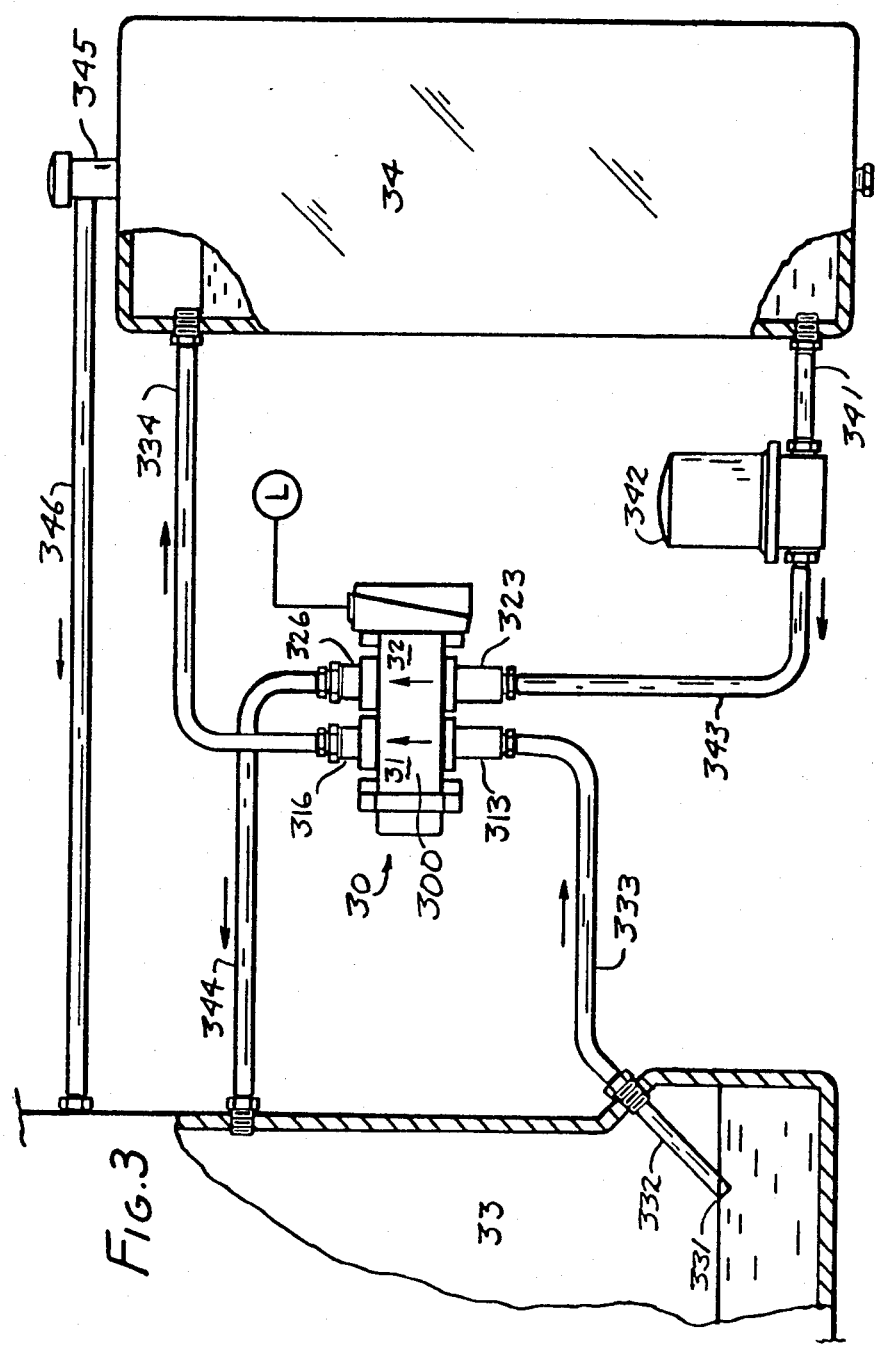

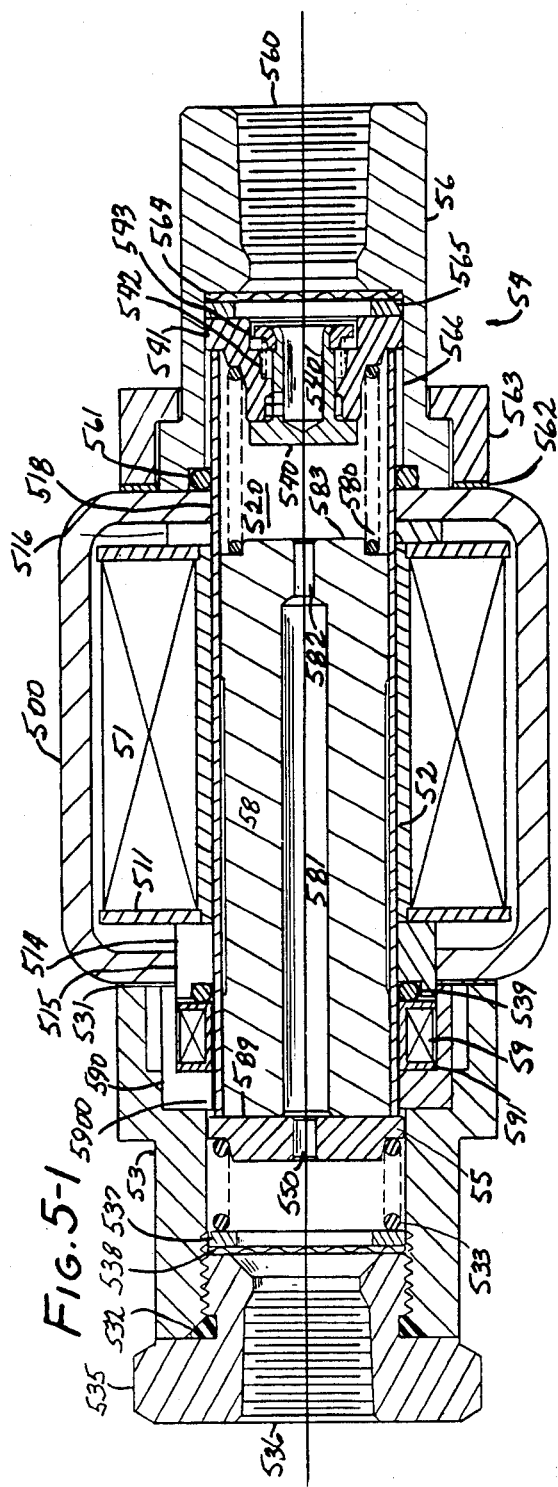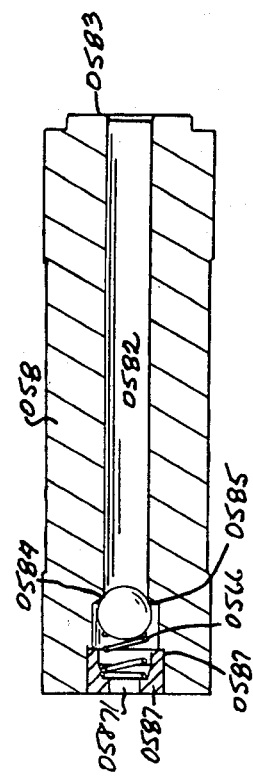

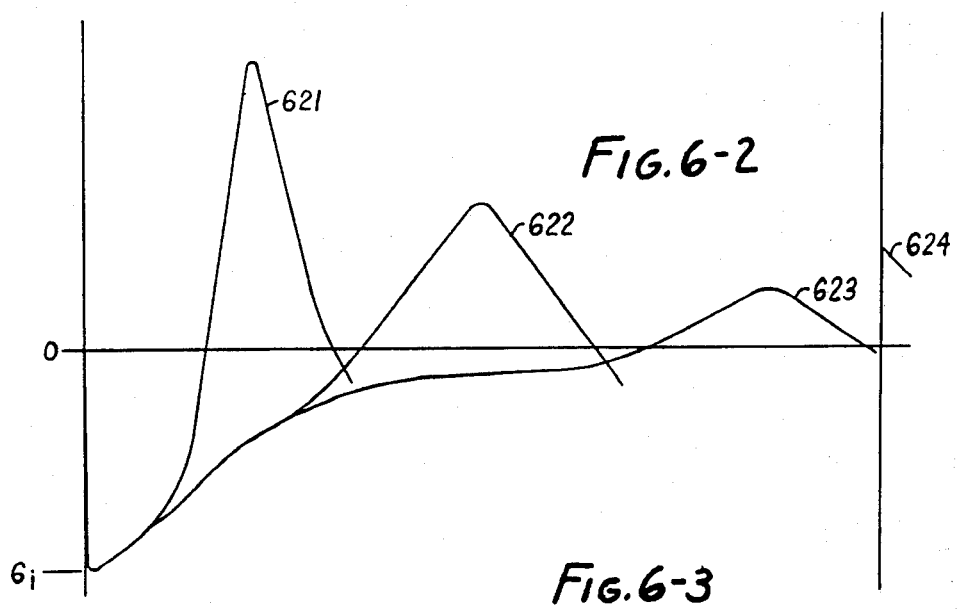
FIG.6-2
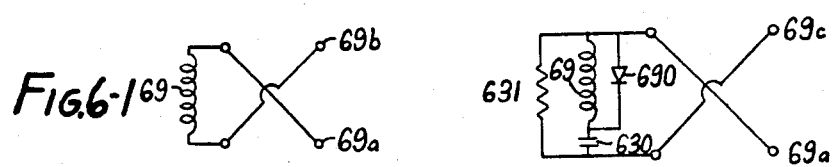
FIG.6-1
FIG.6-3
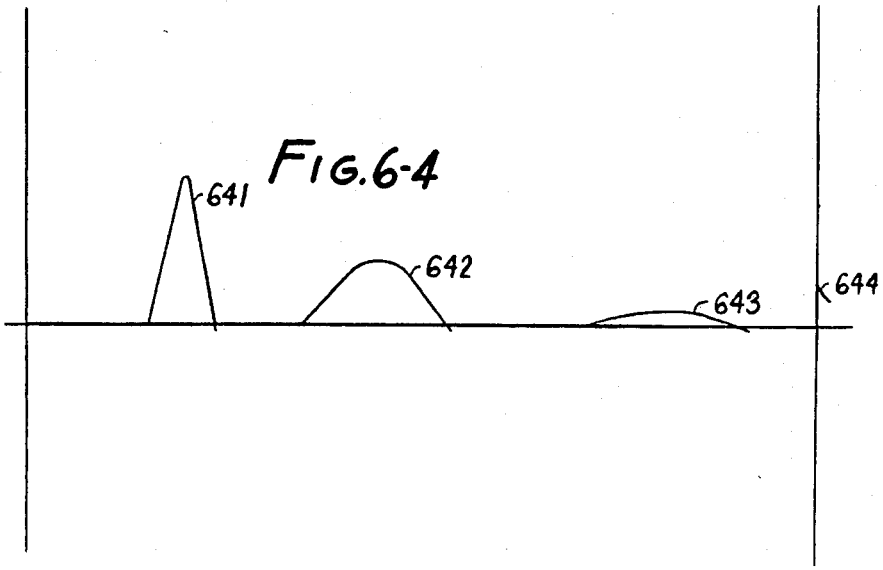
FIG.6-4

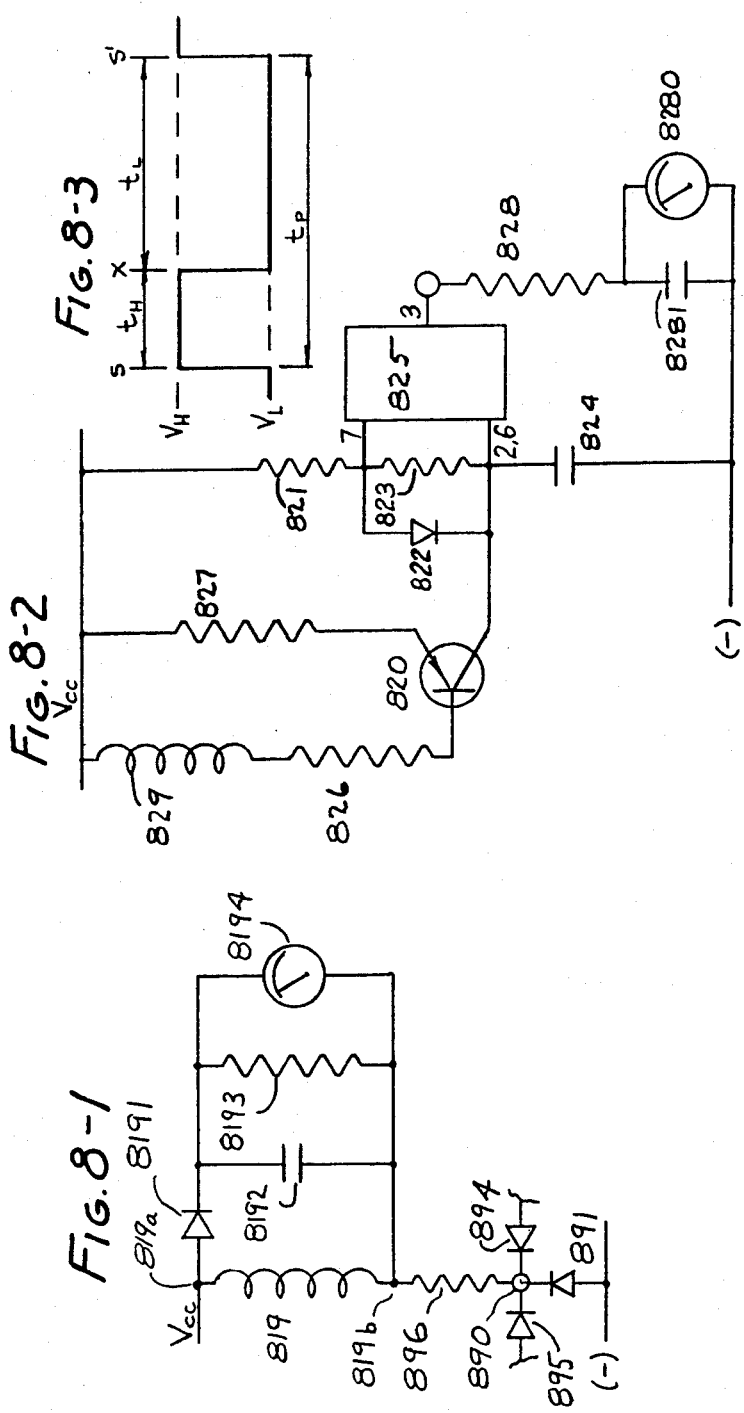

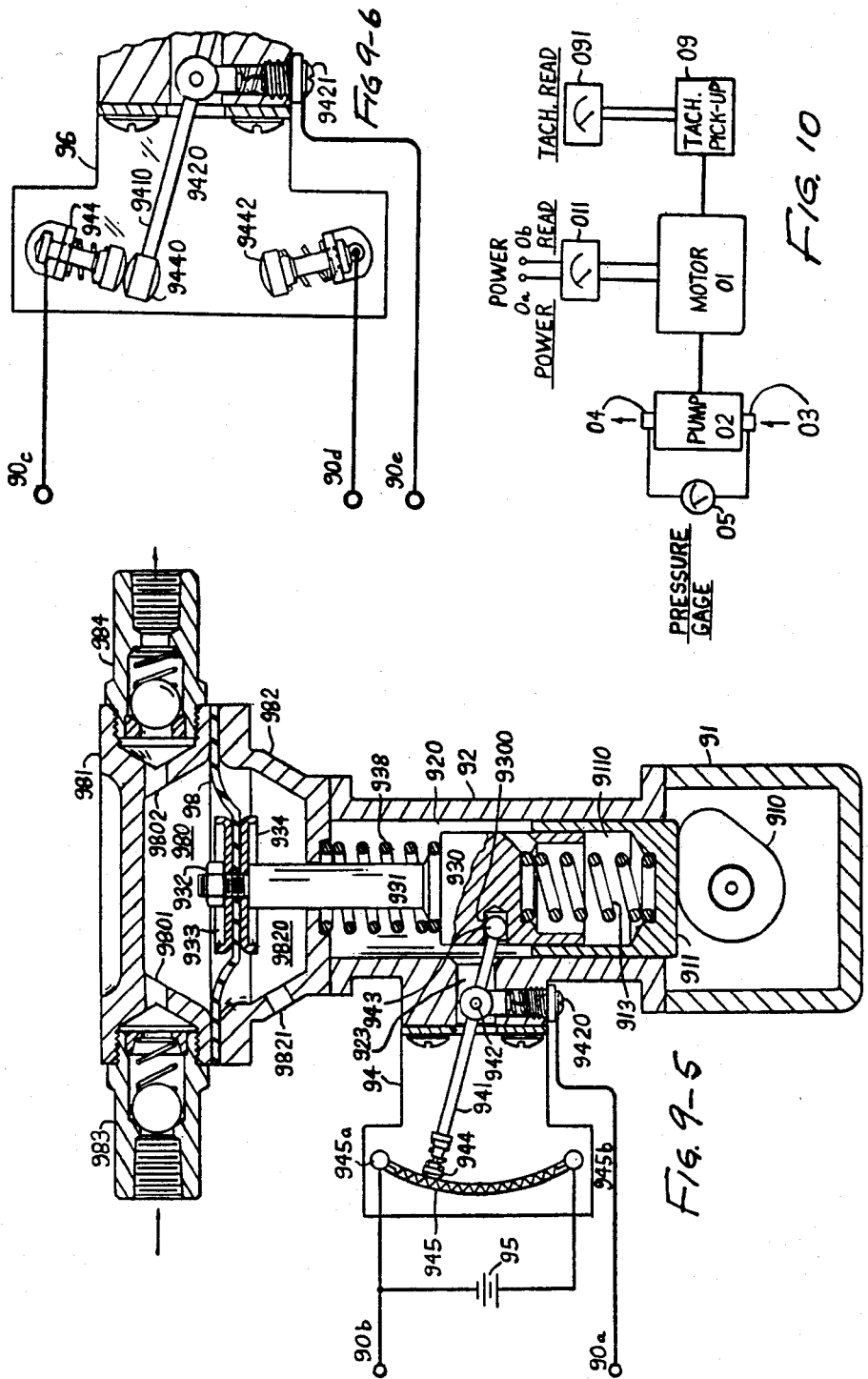

SENSORS FOR DETECTION OF FLUID CONDITION, AND CONTROL SYSTEMS UTILIZING THEIR SIGNALS

CROSS-REFERENCE TO OTHER PATENT APPLICATION

This is a division of applicant's co-pending U.S. patent application Ser. No. 121,463, filed Feb. 14, 1980.

FIELD OF THE INVENTION

This invention relates to sensors which provide information about fluids or the state of a fluid system as a function of opposition by the fluid to physical displacement by a displacement element.

BACKGROUND OF THE INVENTION

There are many sensors for measuring properties of fluids, and they vary widely in utility, sensitivity, ruggedness and reliability. It is a desirable objective to provide a rugged, simple and reliable sensor to respond to properties of fluids which are related to the opposition by the fluid to its own physical displacement. Examples of applications for such a sensor are determining the quality of a fluid, i.e., whether the fluid is all liquid, all gas or vapor, or some mixture of them. Such information can, in turn, be used for information alone, or to control a system to restore the quality to some desired value. An example of a system utilizing this information is a control for the level of oil supply in an internal combustion engine. There are, of course, other applications for sensor which utilize different displacement-resisting properties, for example viscosity, to determine some monitored condition of a fluid, for example the degree of dilution of oil by gasoline.

By sensing the opposition of a fluid to its own displacement, information can both be obtained and can be put to use to control systems which utilize the fluid for some other purpose. To this end, the sensor can also be used as a pump to cause the fluid to flow in the system for an advantageous purpose. One example of such an arrangement is the maintenance of a correct oil level in an internal combustion engine as discussed above. An additional advantage which can be secured is the incorporation of external oil reservoirs in the engine oil system which form part of the actively-used lubricant rather than merely a static reserve. This extends the period between oil changes and the addition of oil, and enlarges the protection of oil systems from excessive dilution by engine fuel. These are important advantages when the engine is in a remote location, or one which is difficult to reach. Improving the reliability of an engine, and decreasing the frequency of routine service visits, can make appreciable cost savings possible.

There are many other uses to which the type of information derived by a sensor according to this invention can be employed for control purposes. It must be said that the applications for sensors according to this invention can be fulfilled by other types of sensors, which may or may not use the same physical property. However, many of the most useful applications of this sensor are in circumstances where ruggedness, simplicity, compactness, and reliability are at a premium, and the sensor of this invention greatly excels many of the conventional sensors available as an alternate.

The range of possible fluid substances with which our invention may deal is limited generally to those which can be pumped or otherwise caused to flow in a fluid path or duct. Within this limitation we may deal with a broad range of possible fluids, which may consist of or contain gases or vapors, liquids, emulsions, mists and even suspended or entrained solids. Among fluids of the same composition we may find variations in physical condition such as of temperature, pressure, viscosity or vapor pressure, which it may be our purpose to identify. Variations in the state or quality of the fluid system which may affect opposition to fluid displacement may include differences in head or state of flow, or the presence or absence of a fluid at a particular point in the fluid system.

BRIEF DESCRIPTION OF THE INVENTION

The sensor of this invention utilizes fluid-displacement means. Because such means do displace the fluid, it is an option to utilize it also as a pump or as means to transfer fluid within a system. The fluid displacement means includes a movable fluid displacement element whose motion is urged by the application of a known force and whose motion is accompanied by either an increase or a decrease in the volume of a region in the sensor which the fluid can occupy. The condition of the fluid affects the resulting motion of the element, and its motion is sensed by electrical means to derive information about the state or quality of the fluid.

According to a preferred but optional feature of the invention, the movable fluid displacement element is a plunger fitted into a bore or barrel that forms a part of means confining the fluid to be displaced to a limited space or spaces, the volume of which altered by motion of the plunger.

In some adaptations of our invention the space or volume available to the fluid during displacement may include not only that which is immediately adjacent to the displacement element but also that which is provided by paths of flow between the element and other parts of the fluid system. In still other adaptations we choose to isolate the fluid momentarily from the remainder of the fluid system in order to respond to the state or quality of the fluid independently of the operating state of the fluid system external to the means employed for fluid sensing.

When fluid is withdrawn from a point in the fluid system for sensing at another point, such sensing may be representative of the state or quality of the fluid at the point of withdrawal. The provision of fluid-displacement sensing means which may be physically separate and even remote from a point of withdrawal is an optional objective of this invention.

More than one displaceable space or volume may be employed for fluid sensing. Such spaces may be adjacent to separate portions of a common element. When such spaces are oppositely displaced, they may communicate with separate portions of the fluid system, or they may be joined by a confined fluid path or duct adapted to receive displaced fluid from one portion of the element and to deliver to the other.

When a fluid displacement element or portion of an element is subjected to an urging force in a fluid-displacing direction, a change in volume of the fluid may occur as a compression or expansion of the fluid if the fluid present is significantly compressible. Alternatively, flow may occur to or from the point of displacement by a path which, by its restriction, offers opposition to flow. Finally, displacement may be absorbed by a combination of compression or expansion and flow in a compensating path.

When displacement is urged at two points, we may choose to make either or both effective in restrictive opposition to fluid displacement, by making either path or both paths limited in area of flow.

Of importance in the application of our invention is the provision of means for purging existing fluid within a sensing space or volume and replacing it with a new fluid. Purging may be accomplished either by employment of our fluid displacement means or by external means. When our invention is employed to serve a pumping function, purging is inherently accomplished by pumped transfer of fluid through the sensing volume.

In one embodiment to be shown, we choose to employ a reversing or bi-directional flow between the fluid sensing space adjacent to the displacement element and a point in the fluid system for which fluid sensing is desired, which we may call a point of exchange. In such case we are limited in the length of path over which exchange may take place.

In the preferred embodiment utilizing a plunger, in order to obtain the driving force required to urge the plunger into a fluid-displacing motion, the plunger is placed within a magnetic circuit which links a main or driving coil which is pulsed electrically to vary the magnetic flux of this circuit and thereby repetitively to vary a magnetic force applied to the plunger.

In the production of a fluid sensing signal responsive to the motion of the displacement element or plunger, we find it desirable to employ further electromagnetic means. Although such means could be independently provided, we prefer to use a portion of the flux of the main magnetic circuit for this purpose, both because of the simplicity which this approach makes possible and because of the convenience which it offers in coordinating in time the activating or driving pulses with the production of fluid sensing signals.

In a preferred but optional construction, a portion of the flux of the main magnetic circuit links a sensing coil variably according to the position of the plunger. In this construction, there is obtained a sharp transfer of flux as the plunger advances, and produces in the sensing coil a strongly induced signal. In one variation of this construction, the advance of the plunger more strongly links the sensing coil to the main magnetic circuit to give a rising-flux induced voltage or EMF in this coil. In another variation, linking diminishes during plunger advance to give a falling-flux induced voltage or EMF. In either case the induced EMF constitutes a sensing signal which varies in intensity and in timing with the varying motion of the plunger and therefore with the opposition of the fluid.

An important object of our invention is the provision of means for differentiating among varying fluid sensing signals, whereby signal characteristics may indicate the varying response of the fluid displacement element to the urging force as determined by the opposition of the fluid. Characteristics of the sensing signal useful for this purpose may include peak strength or magnitude, and timing, as determined by the attainment of a predetermined level, intensity or polarity, or rate of rise or fall. Such characteristics may be useful in the interpretation of signals read by such means as an oscilloscope. They also provide a basis for signal interpretation by electronic means which may resolve the signal into a form useful for information and for the control of further system function.

An important area of application of our invention is that of discrimination between a gas or vapor and a liquid. We may choose to produce by electronic discriminator means an output signal adapted to activate a further system function when the sensing is of a gas or vapor but not of a liquid. Instead we may choose to make the output signal responsive to the presence of a liquid but not of a gas or vapor. It is likewise possible to discriminate between fluids of which neither is a gas or vapor, and to produce an output signal responsive to the presence of either. Output signals may be bi-level in response, indicating merely the presence or absence of a condition of fluid opposition, or they may be ranging in response, indicating by degree the condition of opposition. We may express such an output by way of an analog voltage or of its digital equivalent. More than one output may be provided simultaneously.

A practical system application employing gas and liquid discrimination wil be shown. A first or master pump draws oil from the sump of an engine and delivers to a reserve tank. Withdrawal is from a predetermined level. Should air or other crankcase gas be drawn, the first pumping unit senses air and signals a second or slave pump to return oil to the engine from the reserve. By this means, the level of oil in the engine is maintained substantially constant. At the same time, continued exchange between the engine and the reserve allows the reserve oil to become in effect an active part of the oil in use, with the operating advantages of an extended crankcase volume.

In the units which are physical embodiments of our invention and which we shall show and describe, we employ materials which are broadly divisible into "magnetic" materials, which we shall define for our present purpose as those capable of being magnetized and having high magnetic permeability, and "non-magnetic" materials which may include for our purpose diamagnetic materials and are not capable to significant degree of being magnetized. Low carbon steel is an example of a "magnetic" material. Examples of "non-magnetic" materials are austenitic stainless steel, non-ferrous metals such as copper and aluminum, and non-metallic substances such as plastics and resins.

IN THE DRAWINGS

FIG. 1-2 and FIG. 1-3 represent an enlarged portion of FIG. 1-1 showing the manner in which magnetic fluid sensing is achieved; these figures represent the same construction but in two positions of the moving fluid displacement element;

FIG. 2-1 shows in electrical schematic diagram the sensing coil of the unit of FIG. 1-1;

Figure 1:
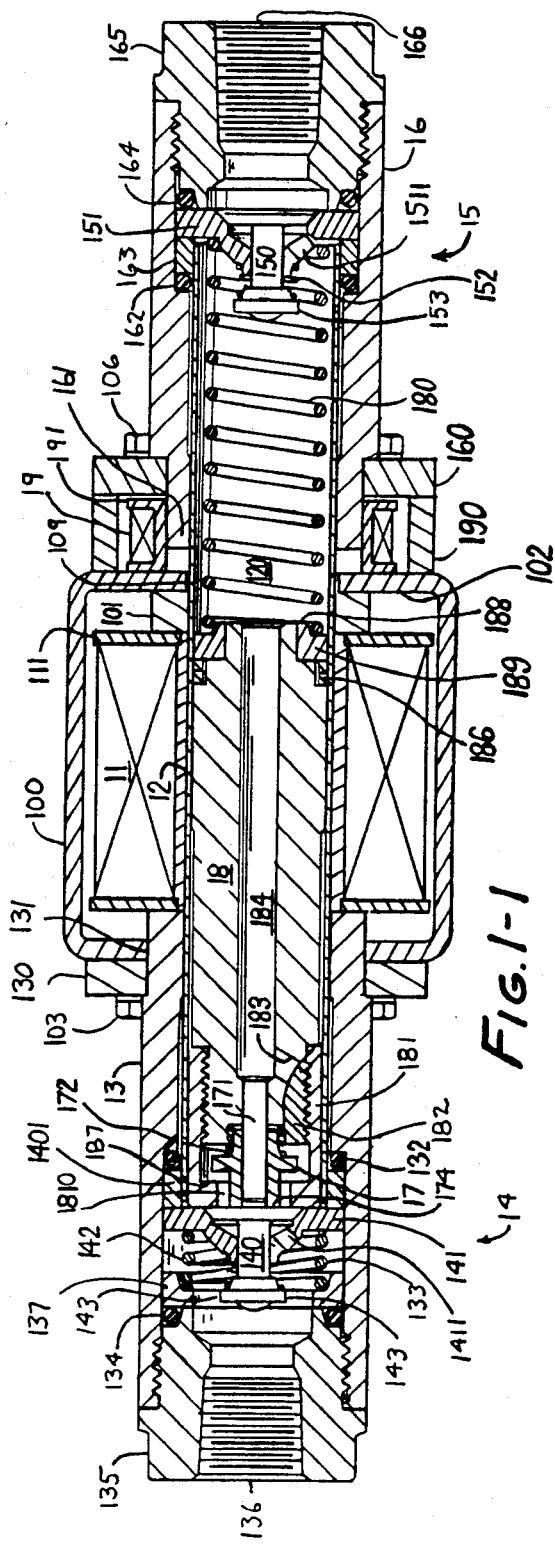
FIG. 1-1 shows in general section a fluid pumping and sensing unit according to our invention.
Figures 1, 2:
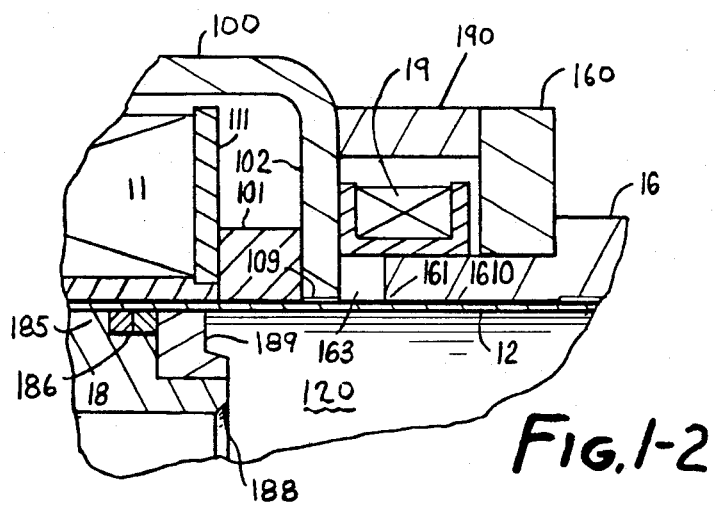
Figures 1, 2, 3:
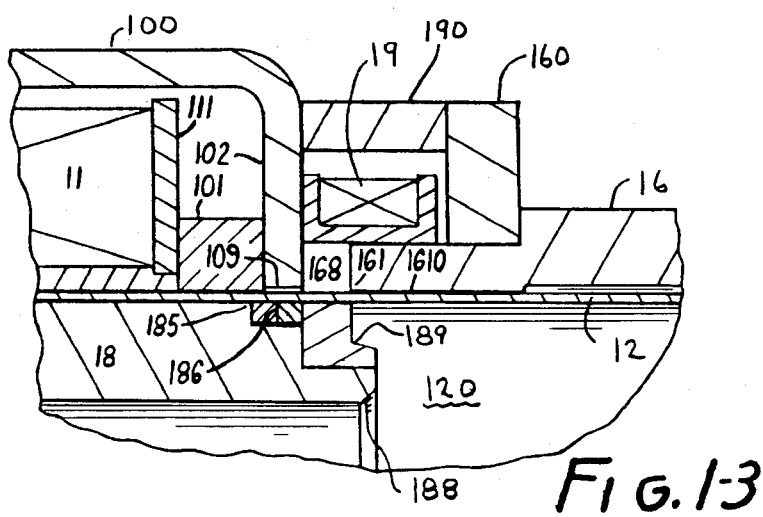
Figure 2:
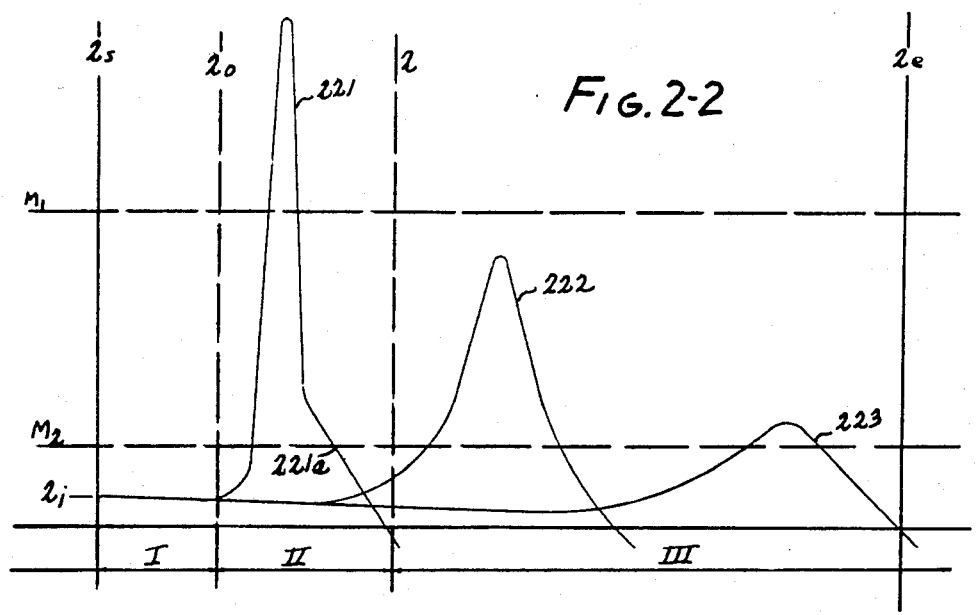
Figures 1, 2:
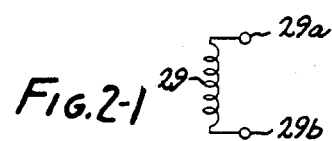
Figures 2, 3:
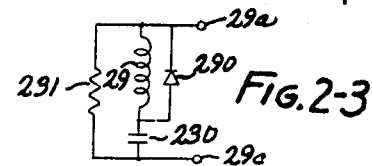
Figures 2, 3, 4:
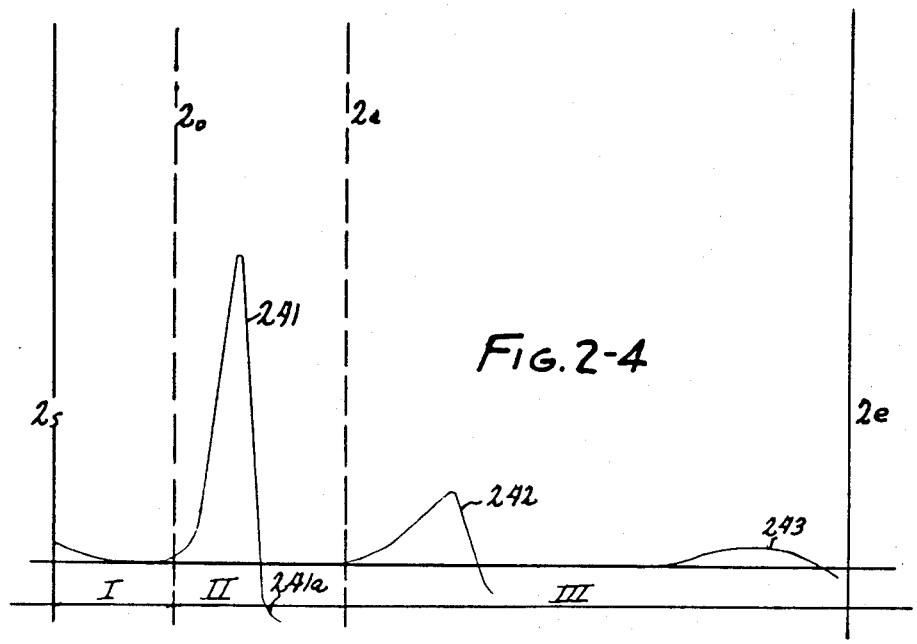
Figure 4:
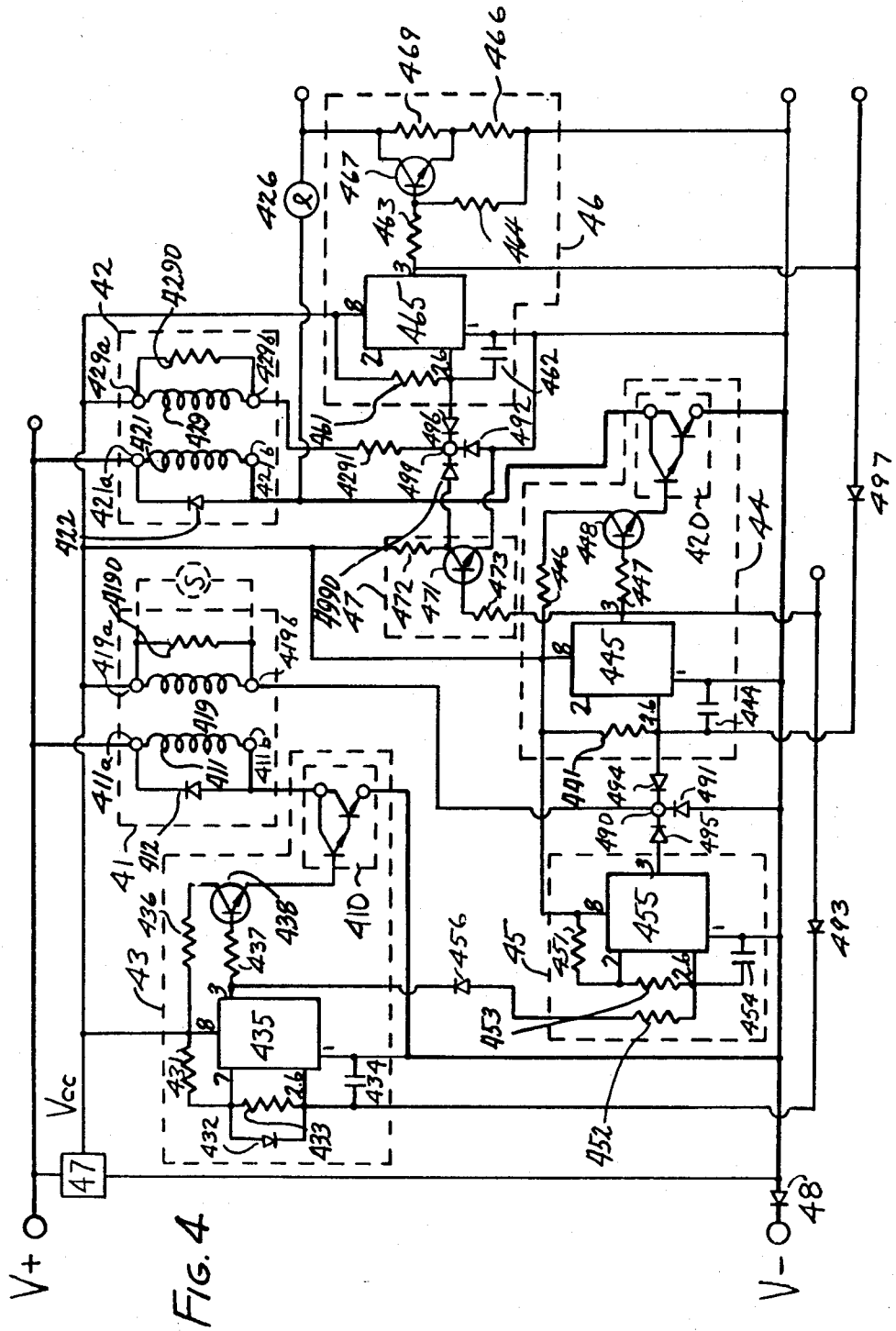
Figure 5:
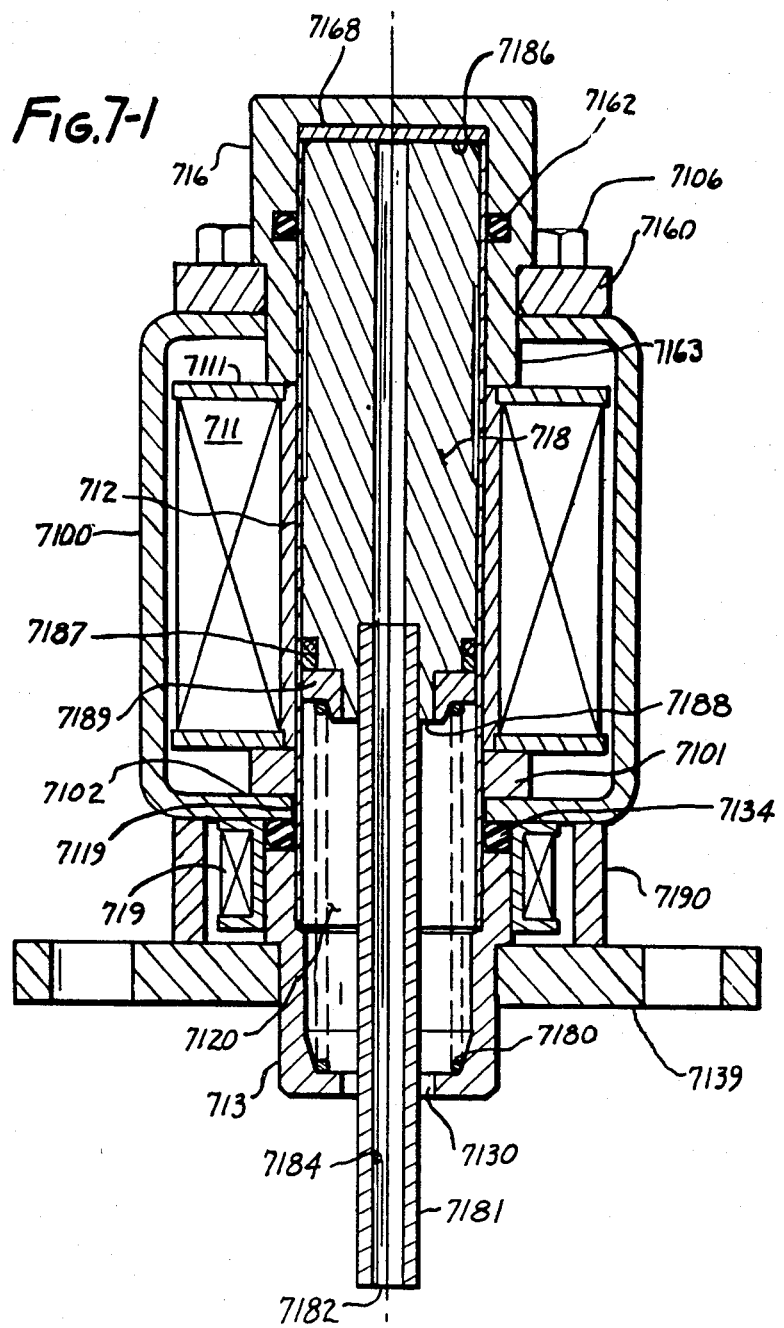
Figure 6:
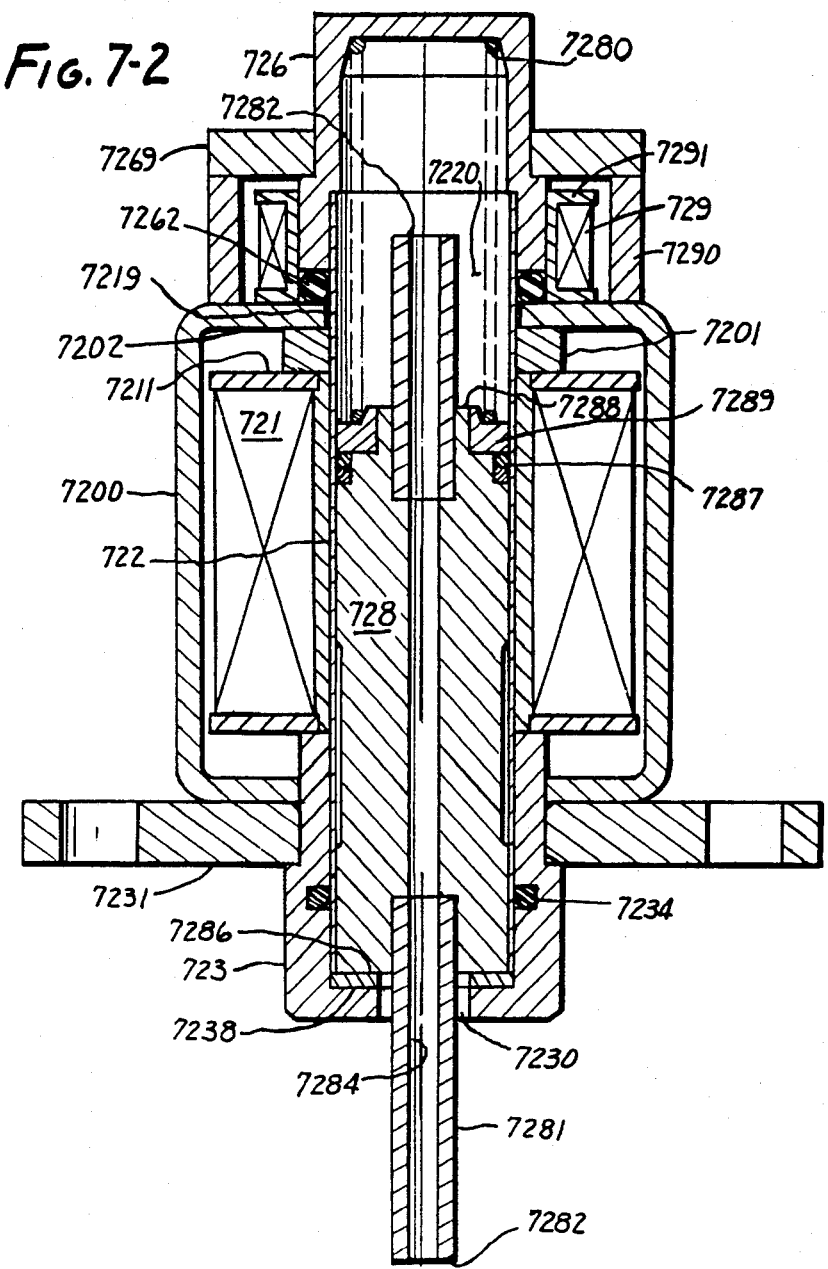
Figures 3, 7:
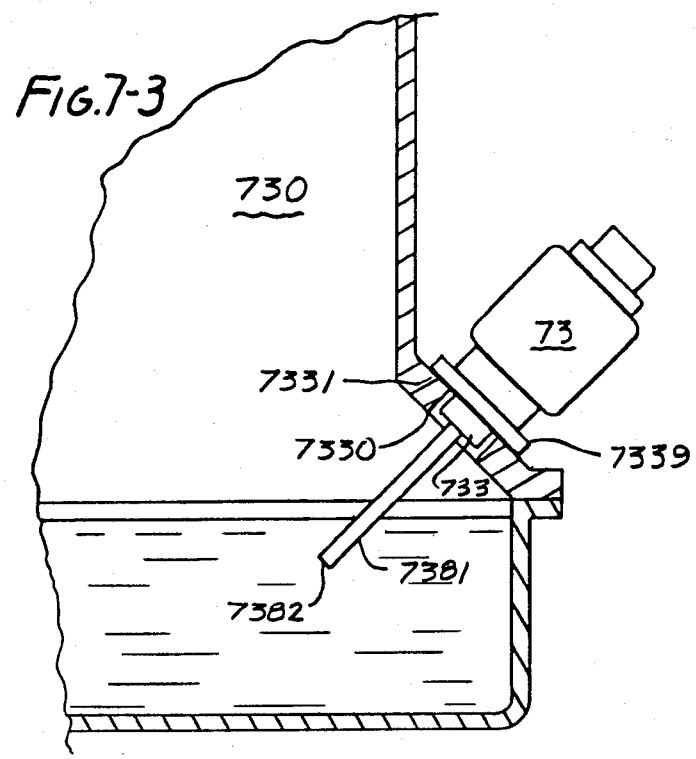
Figures 4, 7:
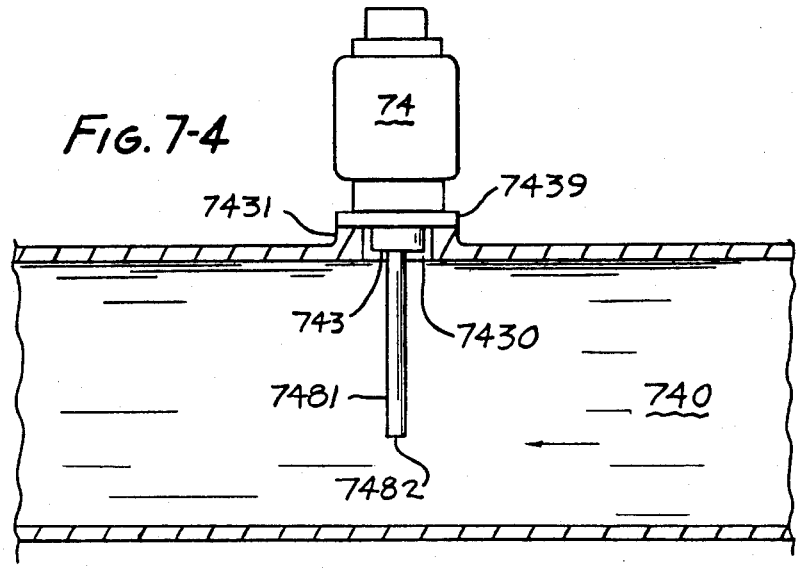
Figures 4, 8:
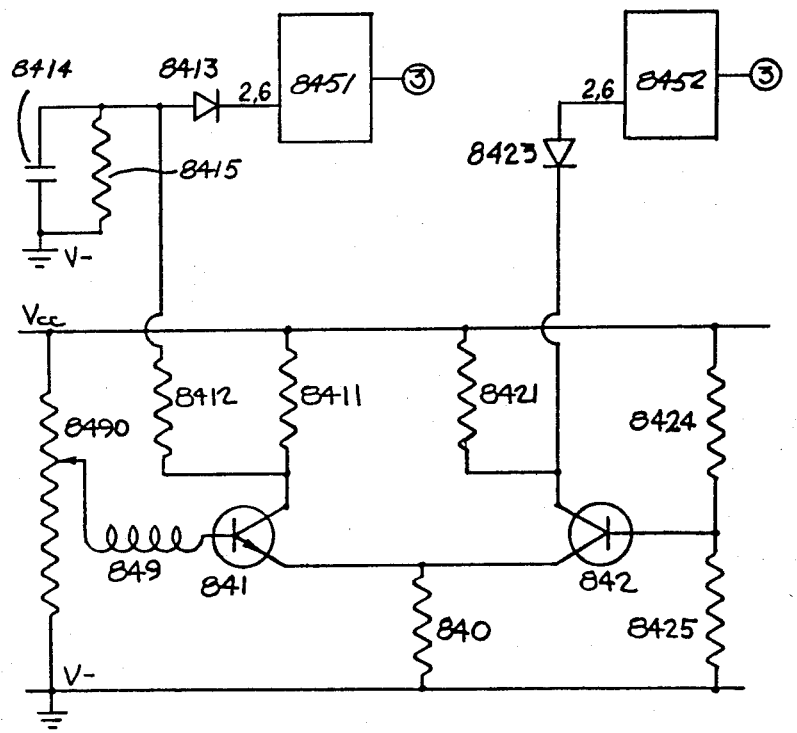

FIG. 2-2 displays a series of sensing curves representative of varying degrees of fluid opposition in this unit;

FIG. 2-3 is an electrical schematic of a circuit for reshaping sensing signals such as those of FIG. 2-2;

FIG. 2-4 displays a series of sensing curves as reshaped by the circuit of FIG. 2-3;

FIG. 3 is a physical schematic or layout of a system incorporating pumping and sensing units as in FIG. 1-1, adapted to the requirements of supplying and controlling the supply of oil to the crankcase or sump of an engine;

FIG. 4 is an electrical schematic of the circuit which is employed with the system of FIG. 3;

FIG. 5-1 is a general section of a fluid sensing unit of different construction from that of the unit of FIG. 1-1;

FIG. 5-2 shows in section an optional modification of the unit of FIG. 5-1;

FIG. 6-1 shows in electrical schematic the sensing coil of the unit of FIG. 5-1;

FIG. 6-2 displays a series of sensing curves generated in the sensing coil of the unit of FIG. 5-1, using the circuit of FIG. 6-1;

FIG. 6-3 is an electrical circuit for reshaping signals such as those of FIG. 6-2;

FIG. 6-4 displays a series of curves of signals reshaped by the circuit of FIG. 6-3;

FIGS. 7-1 and 7-2 show in general section alternative forms of a flange-mounted fluid sensing unit employing reverse-flow fluid exchange;

FIGS. 7-3 and 7-4 show representative physical applications for which either of the units of FIGS. 7-1 and 7-2 may be useful;

FIG. 8-1 shows schematically an electrical circuit adapted to respond to the magnitudes of sensing signals and to produce a ranging or analog output which may be in addition to a bi-level discriminated output;

FIG. 8-2 shows a circuit adapted to produce a ranging or analog output in response to the timing of sensing signals;

FIG. 8-3 shows in diagram the output signal of the timer of the circuit of FIG. 8-2, demonstrating the manner in which the remainder of this circuit develops its ranging output signal;

FIG. 8-4 shows schematically a circuit adapted to adjust the potential level of response to sensing signals and to activate additional circuit elements.

FIGS. 9-1, 9-2, 9-3 and 9-4 show in diagram the magnetic flux transfer patterns applicable to plunger motion sensing means, both of rising-flux and falling-flux configurations.

Figures 3, 9:
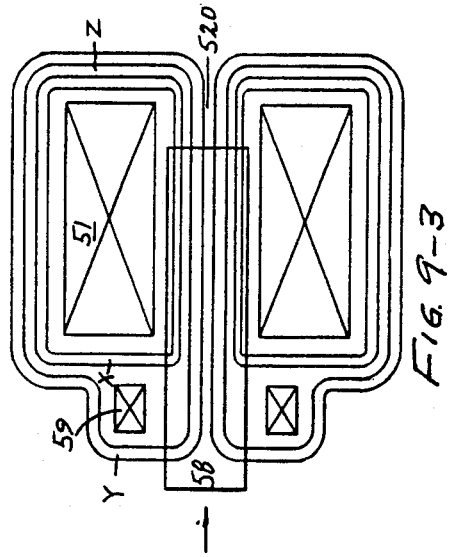
Figures 4, 9:
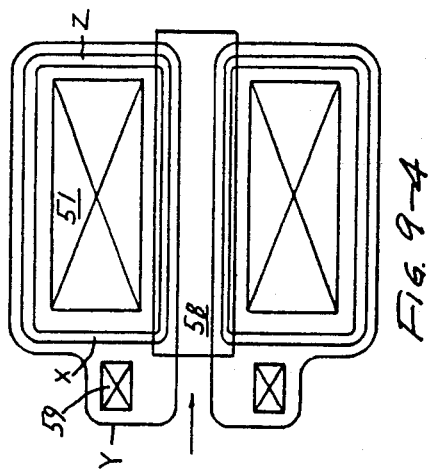
Figures 1, 9:
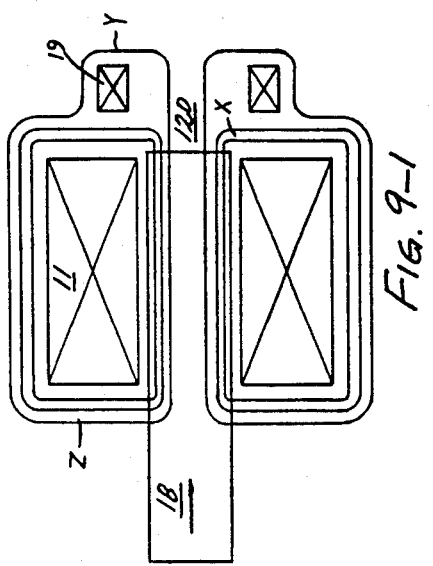
Figures 2, 9:
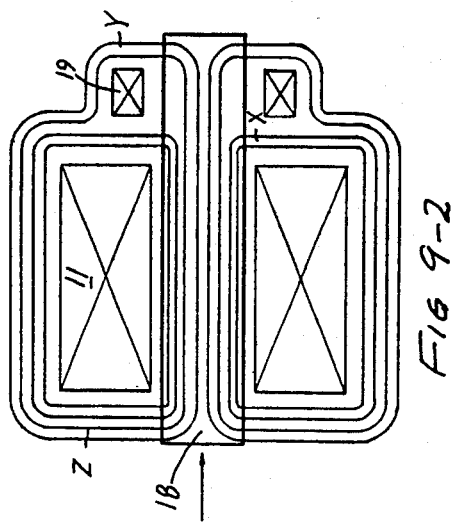

FIGS. 9-5 and 9-6 show a diaphragm-type pumping sensing unit employing also other alternative means for performing the essential operations of a unit and system according to our invention, as applied in a reciprocating construction.

FIG. 10 shows in diagram analogous rotary fluid pumping and sensing means illustrating the generality of our invention in fluid sensing systems.

FIG. 1-1 shows a pumping and sensing unit 10, adapted for connection to an external fluid system. This unit has a body or main housing 100, of low carbon steel and of generally rectangular tubular section. Within this housing is a main or driving coil 11, of enamelled copper wire, wound upon an insulating coil form 111. Coil 11 and form 111 are carried upon tube or barrel 12, preferably of austenitic stainless steel. Barrel 12 traverses the section of housing 100 and is carried by and between inlet body 13 and exit body 16, both of low carbon steel.

Inlet body 13 passes through and is centered within bore 131 of housing 100. Flange 130, of low carbon steel and secured as by brazing to inlet body 13, is secured to housing 100 by screws 103. Inlet bushing 135 threads into inlet body 13, and is ported at 136 for connection to an inlet line or duct from an external fluid system. At its inner end bushing 135 bears against ring 137 and is sealed by O-ring 134. Ring 137 seats buffer spring 133, which urges valve body 141 against ring 1401 to compress O-ring 132 and seal between barrel 12 and body 13.

Valve body 141 of non-magnetic material is ported at 1411 and carries and seats valve poppet 140, also of non-magnetic material. Valve spring 142 urges poppet 140 toward its closed position as shown, and is captured by spring retainer 143, staked to the stem of poppet 140. The completed inlet valve assembly we will call valve 14.

At the exit side of housing 100, barrel 12 passes through bore 109 with a limited diametral clearance which serves a functional purpose to be explained later on. Ring 101, of a flexible non-magnetic material, serves to confine coil form 111 longitudinally.

Flange 160, of low carbon steel, secured as by brazing to exit body 16, is secured to housing 100 by screws 106, which pass through and also secure sensing housing 190, which is of generally tubular section and of low carbon steel. Encapsulated into housing 190 by a potting material is sensing coil 19 of enamelled copper wire and wound upon insulating form 191.

Exit bushing 165 is threaded into exit body 16 and ported at 166 for connection to an exit line or duct to the external fluid system. At its inner end bushing 165 bears against valve body 151, of non-magnetic material, and sealed by O-ring 164. Valve body 151 bears against ring 163 to compress O-ring 162 and seal between body 16 and barrel 12.

Exit valve body 151, ported at 1511, carries and seats valve poppet 150, of non-magnetic material. Valve spring 152 urges poppet 150 toward its closed position as shown and is captured by spring retainer 153, staked to the stem of poppet 150. The completed exit valve assembly we will call valve 15.

Slidably fitted into barrel 12 and sealed by non-magnetic rings 186 is plunger 18, of low carbon steel, the fluid displacement element. Plunger 18 completes internally the main magnetic circuit linking main coil 11. When coil 11 is electrically energized, flux traverses a complete circuit including magnetic housing 100. Magnetic transfer at the inlet end is through inlet body 13 and its flange 130; through the non-magnetic wall of barrel 12 and thus into plunger 18 and its associated end cap 181, also of low carbon steel. Traversing plunger 18, this flux leaves the plunger at its end 188, partially through magnetic ring 189, which is carried upon plunger 18 and also serves as a retainer for rings 186. Thereafter this flux must traverse a magnetically open space 120 and again through the wall of barrel 12 into two return paths to housing 100.

The first of these paths is directly to housing 100 through bore 109, a path not linking coil 19. The second is a path which does link coil 19: into end 161 of exit body 16; through flange 160; and through sensing housing 190 to main housing 100. During energizing of coil 11, plunger 18 is magnetically urged forward to close the gap across space 120 between plunger 18 and these two return paths combined. During a subsequent period of de-energizing of coil 11, spring 180, based between ring 189 and exit valve body 151, returns plunger 18 to its starting position, shown.

At the inlet end of plunger 18, end cap 181, which is ported through its end bore 1810, provides a seat at 187 for non-magnetic valve 17. Valve 17 rides upon and is centered by pin 171 and is urged toward its closed position by spring 172. Valve 17 is initially and for a short portion of the travel of plunger 18 held open by interference between its end 174 and inlet poppet 140 to permit clearing this valve of possible foreign matter during the first portion of each forward or working stroke of plunger 18.

During the forward motion of plunger 18 which occurs when coil 11 is energized, valve 17 closes against its seat 187 and thereafter prevents flow between the ends of plunger 18, the continued displacement of which may be satisfied by the opening of inlet valve 14 and exit valve 15, permitting flow from the external system into inlet port 136 and to the external system through exit port 166. During return motion of plunger 18, valves 14 and 15 close and plunger valve 17 opens, permitting ventilation of fluid past this valve, through passages 182, 183 and 184 to space 120.

At the end of return motion, should the residual velocity of plunger 18 be substantial, its energy may be absorbed by buffer spring 133 through valve body 141, which may yield upon impact of plunger 18.

We will not turn to a discussion of the action by which the forward motion of plunger 18, during a period of energizing of coil 11, is sensed by coil 19.

FIGS. 1-2 and 1-3 show in enlarged section the sensing region including coil 19, sensing section housing 190, flange 160, plunger forward ring 189, sealing rings 186, coil filler ring 101, and portions of main housing 100, coil 11 and its form 111, barrel 12 with space 120, and exit housing 16. FIG. 1-2 shows these parts in the same position as in FIG. 1-1, which is the starting position of the plunger 18. FIG. 1-3 shows the same section, but with the plunger 18 and its associated parts in a partially advanced position corresponding approximately to the point of maximum rate of flux transfer into the magnetic path linking coil 19.

With plunger 18 in its rest position, as in FIGS. 1-1 and 1-2, wall 102 of main housing 100 is closest to the forward end 188 of the plunger and, in effect, is interposed between plunger 18 and the second possible flux path through end 161. During the early part of the travel of plunger 18 following energizing of main coil 11, most of the flux development is through the direct or first path to wall 102. Continued forward movement of the plunger brings the magnetic material of ring 189 into close coupling with the material of wall 102 at its bore 109. As ring 189 passes this bore, it becomes opposite open space 168; at the same time, it approaches the forward portion or end 161 of exit body 16, reaching a position as in FIG. 1-3. At this instant, ring 189 is in the process of transferring its closest engagement from bore 109 to end 161. Flux transfer to bore 109 is partially interrupted by the opposition of the space rearward of magnetic ring 189, magnetically open because only non-magnetic material of sealing rings 186 is within this space. The presence of these sealings rings is coincidental; the magnetic effect would be the same were the space which they occupy to be left entirely open. As may be expected, the maximum rate of flux transfer occurs at or about the position of FIG. 1-3; therefore, the EMF induced in sensing coil 19 is then at or near its peak. Following motion returns close magnetic engagement at bore 109 by bringing the edge 185 of plunger 18 into opposition. It has been found by trial that the sharpest sensing during transfer at the position of FIG. 1-3 occurs if the diameter of bore 109 is somewhat greater than that of bore 1610 at exit body end 161, and that magnetic pull-through of the plunger will be somewhat longer if more dependence is placed upon engagement with end 161, by reducing the transfer at bore 109. Final pull-in occurs as edge 185 enters bore 1610. Sharpness of sensing which this construction gives we find to be most useful in interpretation of and discrimination among sensing signals.

In FIG. 2-1 we show in electrical diagram coil 29, here the equivalent of coil 19 of FIGS. 1-1, 1-2 and 1-3. Across its terminals 29a and 29b we may read voltage or EMF sensings by any convenient means such as an oscilloscope. Sensing curves, plotted against time, appear for several conditions of fluid opposition and rate of motion of plunger 18 in FIG. 2-2. In this figure, vertical lines $2_s$ and $2_e$ represent the start and ending of the period of energizing of main coil 11.

At the moment of turn-on $2_s$ an induced voltage or EMF appears at the terminals of sensing coil 29 in strength $2_t$; weakness of this induced signal reflects the low degree of coupling of coil 29 with main coil 11 at this instant. Were the plunger to remain stationary, this voltage would gradually fall away; but, as the plunger moves forward in actuality, flux transfer into the magnetic circuit linking coil 29 will result in an increase in induced EMF in this coil.

Varying opposition of the fluid is reflected in varying rapidity of motion of the plunger 18. Thus, a condition of low opposition will give the plunger freedom to develop a rapid motion which is reflected both in an early time of arrival at the point of maximum sensing (FIG. 1-3) and in a rapid transfer of flux at this point, with induction of a high EMF in coil 19 (29 in FIG. 2-1). Such a sensing curve will appear as in 221 of FIG. 2-2. Greater opposition of the fluid will result in a curve such as 222, in which intensity is diminished and the time of sharpest induction later. Still greater opposition might result in a curve such as 223, peaking later and of still lower intensity.

FIG. 2-3 shows a simple circuit useful in shaping the basic signals of FIG. 2-2 to accentuate characteristics useful in discriminating among them. In FIG. 2-3, capacitor 230 is connected in series with coil 29 and both are shunted by resistor 231. Diode 290 suppresses reverse EMF generated in coil 29 at the time of turn-off. Signals are read at terminals 29a and 29c. We now find that the peak intensity ratio of successive signals, which we had observed as 221, 222 and 223 of FIG. 2-2, becomes greater when the signals are reshaped by the circuit of FIG. 2-3, and that the ramp portion 221a of the original signal has now been driven negative, as at 241a of FIG. 2-4. The re-shaped curves of this figure, corresponding to those earlier indentified as 221, 222 and 223, are shown in FIG. 2-4 as 241, 242 and 243.

It will be noticed that the actual magnitude of the curves as re-shaped is in each case less than that of the signal before re-shaping. Likewise, the period of each signal is diminished by re-shaping. Thus, re-shaping by this method offers an improved definition of the time of occurrence of each signal. We have found that, as might be expected, reduction in the ohmic value of resistor 231 gives increased attenuation, both in terms of maximum or peak magnitude and in terms of signal duration.

While we have here shown a simple and effective means for signal re-shaping, it will be obvious that other circuit means could be substituted for that shown without impairing its essential purpose and function, which is that of useful resolution of the sensing signal.

FIG. 3 shows in diagram the physical arrangement of a system for controlling the supply of oil to the crankcase or sump of an engine or compressor. This system is of importance of itself and of interest in illustrating an area of application of our invention.

In the figure two pumping and sensing units having a typical section as in FIG. 1-1 are combined into a single housing 300 as a dual unit 30. Individually, we shall call the first unit 31 and the second 32. By electrical and electronic means later to be shown, unit 31 is driven repetitively to pump fluid received at its inlet 313 and to deliver at its exit 316. Fluid drawn into unit 31 originates within crankcase or sump 33 at the level of the end 331 of tubular duct 332 and passes thereafter through line 333 to inlet 313. Fluid leaving unit 31 passes through line 334 and into a reservoir 34.

Whenever air (or other crankcase gas) is withdrawn at 331, it passes into unit 31 and will cause generation of a strong sensing signal similar to 221 of FIG. 2-2 or, as reshaped, like that of 241 of FIG. 2-4. By electronic discriminator means to be shown, these signals activate unit 32 to draw oil from reservoir 34 through line 341, optional filter 342, line 343 and unit inlet 323. From unit 32 oil delivers through exit 326 and line 344 to the engine or compressor crankcase or sump.

Air or gas passing into reservoir 34 by action of unit 31 may be collected at riser 345 and returned to crankcase 33 through line 346.

When, by the action just described, the level of oil in crankcase or sump 3 has been raised sufficiently to submerge tube end 331, only oil will be drawn into unit 31. Sensing signals characteristic of stronger fluid opposition will then be generated in unit 31. As will later be shown, these are rejected by our discriminator means and do not activate unit 32.

Whenever oil is low in sump 33, the net result of the action which we have described is to raise the oil level therein by replenishment from reservoir 34. Whenever oil is high in sump 33, the net result is to lower this level and to deliver oil withdrawn to the reservoir. In practice, this action occurs in rapid alternation of mode not only to produce a general circulation between reservoir 34 and sump 33 but also to hold the level of oil in sump 33 in close approximation to that of tube end 331.

Since activation of unit 32 requires continued air or gas sensing signals from unit 31, replenishment of oil in sump 33 may occur only when needed. Should the level of oil in sump 33 become too high for any reason, such as the result of manual over-filling, the correct level will be rapidly restored. Thus, the system which we have described is relatively immune to the effects of over-filling, a not uncommon problem among liquid level systems.

Another important advantage of the system of FIG. 3 is that the continued exchange of oil between sump and reservoir has the effect of incorporating the oil of the reservoir into the total active volume of oil available to the engine. This allows periods between required engine servicing to be greatly extended.

The physical arrangement of the system of FIG. 3 serves to illustrate some of the basic requirements of interpretation of fluid sensings applicable to the unit of FIG. 1-1 as well as to other units still to be shown.

We have already stated the fundamental limitation of our invention, which is to the sensing of the opposition of fluid substances which can be pumped or otherwise caused to flow in a fluid path or duct. What our primary invention senses is the ability of our fluid displacement element to move against the opposition of the fluid. As we have already indicated, fluid opposition may depend upon kind or physical condition of the fluid, upon the operating state of the fluid system to which a sensing unit is applied, or both together.

Variations in operating state of the system illustrated by FIG. 3 include possible variations in kind of fluid present at withdrawal point 331, and possible pressure or head requirements placed upon either or both pumping units. Thus, a particular installation may impose a substantial lift requirement between intake at point 331 and delivery of line 334 into reservoir 34; or from the level of liquid in the reservoir to the point of delivery into the crankcase or sump 33 from line 334. Pressure differences could also exist between reservoir 34 and crankcase 33.

Among physical properties of the fluid which affect fluid opposition to physical displacement and to pumping or transfer through a fluid line or duct are density, viscosity, compressibility (or expandability) and vapor pressure. In turn, these properties reflect the kind of fluid and other physical conditions such as temperature or pressure. The "state" of the fluid, i.e., whether gas, vapor, or liquid is also important. The term "quality" is sometimes used herein to denote whether and what proportion the fluid is of gas or vapor, liquid, or a mixture of them.

Generally, gases or vapors with which our invention may deal will be of low density or specific gravity, of low viscosity and of high compressiblity by comparison with most liquids; although compressibility may vary radically with differences in the basic pressure of a gas or vapor. Generally, the foregoing factors tend to favor gases or vapors in ease of displacement or transfer. Among liquids, differences in density may be sufficient to permit discrimination; sometimes this is a possibility among gases. Density affects pressure drop in a pumped system in two ways: first, because of the effect of inertia of the fluid upon its ability to accelerate in response to a fluid-displacing motion; secondly, because of losses in pumped or displaced head associated with line flow and orifice restrictions.

Viscosity affects pressure drop throughout a fluid system and is of particular importance among liquids. It is often temperature-dependent. In such a system as that of FIG. 3, viscosity may be of major importance, particularly when it is required that we deal with highly viscous oils or long lines which may accentuate viscosity effects.

Compressibility, which favors the motion of the displacement element, is of particular importance in the case of a gas or vapor. We may consider compressibility positive when the fluid is in communication with a positively displacing element, and negative ("expandability") with a negatively displacing (receding) element or portion of an element. Where displaced fluid includes both a gas or vapor and a liquid, the effect of compressibility may be substantial.

The effect of vapor pressure of a liquid when subjected to the action of a receding fluid displacement element or portion of an element will be considered later on in connection with a unit to be shown.

We now turn to electrical and electronic circuitry appropriate to the requirements of a dual-pump system such as that of FIG. 3. We will describe this circuit, which is that of FIG. 4, both as applied to this specific requirement and as it relates to the requirements of more general application; both with the unit of FIG. 1-1 and FIG. 3, and with other related units to be shown.

The basic activating requirement applicable to this and similar units is that of providing the required repetitive pulsing cycle whereby current supplied to drive the main coil of each unit may be controlled. Strictly speaking, it is not a requirement of any unit that power to a driving coil be switched; it is sufficient to the purpose that the current be varied to produce a workable repetitive pattern of activation and relaxation of the main driving coil of each unit. In practice, as well as in theory, we find it most acceptable, however, to employ a simple switched pattern of current variation, in which a driving voltage is applied repetitively for timed periods with periods of no power supply between. Thus, we may define an "ON" time as that of application to a main coil of its driving voltage; we may call this the time of energizing; and "OFF" time as a time between driving "ON" periods, when substantially no voltage is applied to the main coil.

Similarly, a wide variety of means may be employed to produce the required current control or switching pattern. We shall herein show a preferred method and means for fulfilling this purpose, it being understood that electrical or electronic equivalent means may be substituted without impairing the spirit of our invention. In a similar way, other electrical or electronic means for performing subsequent functions of our circuitry may be substituted for the preferred means which we shall show and describe.

In the circuit of FIG. 4, power from a direct current supply at optional working voltage delivers on its positive side V+; first, to a conventional voltage regulator 47 for supply of a controlled voltage Vcc to logic elements of our circuit; secondly, to one end of the driving coil of each single pumping unit: specifically, to end 411a of main coil 411 of first unit 41, and to end 421a of main coil 421 of second unit 42. These units correspond electrically to the physical units 31 and 32 of FIG. 3. Cycle control unit 43 controls the switching of power to coil 411 of pumping unit 41 and cycle control unit 44 controls the switching of power to coil 421 of second pumping unit 42.

The negative side V— of the power supply enters through a protective diode 48 and sinks to negative all logic elements, voltage regulator 47, and the emitter of each of the power or switching transistors 410 and 420, which switch the remaining ends 411b and 421b of coils 411 and 421, respectively. Spikes generated at the time of turn-off of each of these main coils are by-passed by protective diodes 412 and 422, respectively.

Power transistor 410 is driven under control of pilot transistor 438 by current through resistor 436 from voltage regulator 47 at voltage Vcc. Pilot transistor 438 is itself driven through resistor 437 from the output terminal 3 of timer 435, which is of the well-known 555 type of integrated circuit of which detailed descriptions are generally available. We will here limit our description of this 555 unit to material needed for our present purpose.

Timer 435 is powered at its positive side from voltage Vcc and connects to negative at V—. As here employed within cycle control block 43, this timer produces a cyclically varying voltage at its output terminal 3. This is a switched function which at "high state" approximates Vcc to energize pilot transistor 438 to drive coil 411 through transistor 410. At alternate "low state", terminal 3 sinks to approximately V— and no drive is present. Thus, "high state" corresponds to "ON" and "low state" to "OFF".

Within the 555 timer an output section performs the required switching between high and low states under the control of a flip-flop or bi-stable multivibrator. An internal voltage divider provides reference voltages at two levels: one called "trigger level" at approximately one-third of Vcc; one called "threshold level" at approximately two-thirds of Vcc.

Terminal 2 connects to an internal voltage comparator referenced to trigger voltage. When a voltage applied to terminal 2 is lower than trigger voltage this comparator drives or holds the flip-flop and the terminal 3 output into high state. When a voltage is applied to terminal 6 at higher than threshold level voltage a comparator referenced to threshold voltage drives or holds the flip-flop and terminal 3 into low state. At low state terminal 7 provides a sink to negative V— for any current-limited or high-impedance source of positive voltage. As we employ this unit, terminals 2 and 6 are connected as terminal 2,6 to provide a mutually exclusive response to a single externally supplied voltage which may be above threshold level, below trigger level, or in between. In the present case we connect terminal 2,6 to the positive side of capacitor 434, the opposite side of which connects to V—. The unit therefore responds to capacitor voltage to hold or change its state.

Whenever the timer 435 switches into high state, which will occur when a descending voltage at terminal 2,6 reaches trigger level, capacitor 434 begins to charge by a current from Vcc through resistor 431 and diode 432. The rate of charge and therefore the time required is determined by the value assigned to resistor 431 and the capacitance of capacitor 434. Charging continues until the voltage at terminal 2,6 reaches threshold level and the timer goes into low state. Thereafter discharge terminal 7 absorbs the delivery of resistor 431 and at the same time discharges capacitor 434 at a rate determined by resistor 433. This continues until the voltage at terminal 2,6 again reaches trigger level and the timer goes into high state. Thus, the cycle is repetitive and the timer thus connected functions as an astable multivibrator. As will later be seen, the 555 timer may also be connected to function as a monostable unit either in low or high state, responsive to external voltage changes sufficient to produce a single period of operation in the opposite state before returning to stable condition. However, as the 555 timer is used in control block 43 only astable operation is possible.

We have already shown the manner in which, by transfer of flux linking sensing coil 19 (FIG. 1-1), a sensing signal is induced which may vary in timing and intensity with varying fluid opposition to forward motion of a unit plunger. We originally postulated an on-off cycle or time period of energizing of the main coil of a unit, and have, in the foregoing material, shown a way in which this cycle may be produced. Sensing curves were shown in the form in which induced in FIG. 2-2, and as re-shaped by a simple circuit of FIG. 2-3 in FIG. 2-4. We will now develop the way in which we may employ these signal selectively for the control of a further system function: in this case, the activation of the second pumping section or unit 32.

In the control block 44 we show a 555 timer adapted as before to control operation of a pumping unit 42 through a power transistor 420. In this case, timer 445 of block 44 is connected to be normally stable in its low state. Capacitor 444 is normally held in charged condition by current from Vcc through resistor 441; but at a voltage limited to threshold value by sinking through the threshold comparator which connects to terminal 2,6. Should the voltage at terminal 2,6 be driven to or below trigger level, timer 445 will go into a high state for a period determined by the values of capacitor 444 and resistor 441, which determine the time required to charge this capacitor to threshold level, at which level timer 445 reverts to low state. During this high state period, terminal 3 of this timer is also high, and, as before, drives transistor 420 through resistor 447 and pilot transistor 448 to hold in "ON" condition coil 421 of unit 42.

First sensing coil 419, which may be adjusted in strength of its generated signals either by adjustment of the number of its turns or by use of a shunting resistor such as 4190, produces a signal varying in strength as already shown in FIG. 2-2. For this coil arrangement we may choose to substitute the coil, capacitor and resistor combination of FIG. 2-3 if a re-shaped signal is desired. In either case, we apply the generated signal to tie point 490, which connects through diode 494 with terminal 2,6 of timer 445. Normally, the voltage at this point is Vcc. Since connection to this tie point is to the negative side of either sensing coil circuit, any signal which appears at coil 419 will depress the voltage at tie point 490. To depress this voltage enough to cause triggering of timer 445, the voltage difference across the sensing coil terminals 19a and 419b, or the equivalent terminals of a re-shaping circuit if used, must be at least the difference between Vcc and trigger voltage of timer 445, plus the voltage drop of diode 494.

It is possible to adjust the strength of the sensing coil 419 so that any of the sensing signals as shown in FIG. 2-2 or 2-4 will be sufficient for this purpose. However, in the present instance it is desired to make triggering of timer 445 responsive to early and stronger signals rather than later and weaker ones, since it is our purpose to respond to the stronger air or gas signals but not to the weaker signals characteristic of oil. Thus, we may adjust the strength of the signal so that early and strong signals such as 221 or 241 will cause triggering, but so that weaker signals such as 222 or 242 will not. Thus, second pumping unit 42 may be activated in the presence of air in first pumping unit 41 but not when oil is predominantly present. For purposes of this disclosure, units 41 and 42 are regarded as the equivalents of units 31 and 32.

We may note here that this method of activation of the second or replenishment pumping unit 42 renders false action of this unit virtually impossible, because continued sensings of air or other gas by unit 41 are required to maintain function of unit 42.

We may sometimes find that variations in the operating condition of this system, such as those relating to temperature or to non-standard voltage of the power supply, may make separation of triggering and non-triggering signals by this method of signal strength or intensity alone difficult. For the purpose of improving discrimination under such abnormal conditions, and as a separate basis for signal response, we may employ time-gating by employment of a timed signal generated by such means as afforded by gate timer block 45, which permits triggering as above described during a portion of the "ON" period of master timer block 43 corresponding to the timing of wanted triggering signals; but which prevents triggering by unwanted signals by injecting a blocking voltage at tie point 490 during the time of their occurrence.

In unit or block 45 of FIG. 4 we show a 555 timer numbered 455 which is normally monostable in high state whenever master timer 435 is in low state. In this condition terminal 3 of timer 435 sinks to V— any delivery of current through diode 456 and resistor 452 from capacitor 454 and terminal 2,6 of timer 455. This terminal is fed from Vcc through the series resistors 451 and 453, between which a connection is made to terminal 7 of their 455. The voltage split of these resistors and diode 456 between Vcc and terminal 3 of timer 435 is such as to maintain the voltage at terminal 2,6 of timer 455 at level intermediate between trigger and threshold level of timer 455.

When timer 435 goes into high state in its normal cycle of operation its terminal 3 goes high and blocks any further current through diode 456 and resistor 452. Thereafter current through resistors 451 and 453 from Vcc causes capacitor 454 to charge and therefore the voltage at terminal 2,6 of timer 455 to rise. When this voltage reaches threshold level timer 455 switches into low state. The preceding high state period of timer 455 from turn-on of timer 435 to its switching point into low state we will call, in FIG. 2-2 and FIG. 2-4, period "I", or the period beginning at time $2_s$ and ending at time $2_o$. During period "I" the output terminal 3 of timer 455 is high at substantially Vcc and delivers this voltage, less the minimal drop of diode 495, to tie point 490. This delivery is of low impedance in relation to that of the sensing circuit, either directly from coil 419 or as re-shaped. Therefore, this signal from timer 455 during period "I" substantially dominates at tie point 490, making triggering of timer 455 during this period impossible.

During period "II", which begins at time $2_o$, terminal 3 of timer 455 is low but blocked from draining potential at tie point 490 by diode 495. During this period any sensing signals of sufficient magnitude may trigger discriminator block 44 through terminal 2,6 of timer 445.

The length of period "II" is determined by the rate of discharge of capacitor 454 through resistor 453 to terminal 7 of timer 455, which at this time substantially sinks to V—. When terminal 2,6 and capacitor 454 reach trigger level at time $2_c$ timer 455 again goes high and resumes delivery of its blocking voltage at tie point 490; thus blocking out any sensing signals which occur thereafter. At this point period "III" begins; this period continues to the time of turn-off $2_c$ and beyond into the "OFF" period of timer 435, in which period the then high state of timer 455 becomes its stable condition as at the starting time.

It will now be seen that two conditions are now required to trigger timer 455: that sensing signals be of sufficient strength; and that they occur during the open period "II" of gate timer block 45. Thus, when we employ this gating method, we need not set up the relatively close calibration required to permit discrimination by signal strength or magnitude alone; but, instead, may be free to employ sensing signals so strong that, left free to act, they could trigger timer 445 throughout the entire "ON" period of the master cycle.

In the application which we have been describing we normally trigger timer 445 on early, stronger signals and reject later, weaker signals. However, by varying the values of resistors within block 45 we are able to determine at will the timing of period "II", which could have been made to admit for triggering later, weaker signals while excluding any others. In practice, we have found it possible to make period "II" admit signals during any portion of the total "ON" period, wide or narrow.

The value of this gating method extends beyond the application so far shown. Gating is, in fact, a powerful tool, valuable over a broad range of applications of our invention, both as applied with the unit of FIG. 1-1 and with other units which we shall later show and describe.

In the system of FIG. 3, which we have been describing, the time during which the output of block 44 is in high state and the main coil 421 of second pumping unit 42 energized is determined to suit the requirements of unit 42. The output of timer 445 may, in the generality, be regarded as a bi-level digital signal, the pulse length of which, as a high-state output function, could be made to have any desired duration and, if desired, could become a steady-state signal held as such by repeated triggering of timer 445.

The remainder of the circuit of FIG. 4 shows the manner in which our second pumping unit 42 may itself generate a sensing signal which may in turn trigger a second discriminator block 46, the timer 465 of which is connected similarly to that of block 44, and which is triggered through second tie point 499. In this application, such triggering may occur should reservoir 34 become depleted and unit 32 (FIG. 3) senses the presence of air. Discriminator timer 465 then produces high-state output pulses adapted to drive an output or signalling transistor 467 through resistor 463. Signalling means such as lamp 426, based on second unit terminal 421b, is activated by this transistor, which shorts out resistor 469, the function of which, when not so shorted, is to give a continuous low level of power to lamp 426 during periods when unit 42 is not in operation, and to show additionally by low-level pulsing when unit 42 is in operation. Resistors 464 and 466 provide conventional current limiting of this circuit.

It will be noted that no gating block such as 45 has been provided in the circuit of FIG. 4 at tie point 499, which control activation of second discriminator timer 465. For this application the signal strength ratio of peak intensity of air signals to oil signals is usually sufficient, either with signals as generated in coil 429 (as in FIG. 2-2) or as reshaped by the circle of FIG. 2-4). Simple adjustment of the number of turns of sensing coil 429 or of the value of shunting resistor 4290 will permit separation of and discrimination between air and oil signals without recourse to additional means for separation of signals.

It is well known in the art to employ signals such as those generated by our sensing means to control the activation period of a pump of this class, as by feed-back to a multivibrator or other primary activating means. In the circuit of FIG. 4 we may optionally terminate the activating period of either unit 41 or 42 when a sensing signal has activated a discriminator circuit such as 44 or 46. In the case of a dual-pumping system as in this application, such feed-back permits a first pump to be de-energized at the time of turning on of the second pump; thereby avoiding doubling of the power requirement during activation of the second pump. It is of lesser importance in the case of mere activation of a signalling circuit, as that of block 46.

In the system of FIG. 4, feed back at the time of turn-on of unit 42 is accomplished by feeding back the high state voltage which then appears at terminal 3 of timer 445 through diode 493 to terminal 2,6 of master timer 435. The voltage at this terminal is immediately driven to threshold level and timer 435 goes low, terminating power supplied to main coil 411 of unit 41. During the period of this signal from timer 445, master timer 435 is held at threshold level; but may resume normal action at the conclusion of this signal. Feed back from block 46 through diode 497 to end high state of block 44 is in the same manner.

We have so far used the system of FIG. 3 to illustrate some of the physical and system variable conditions with which we may be required to deal. In this system we have usually found that variations in head and pressure may be kept within tolerable limits permitting adequate sensing of fluid kind independently of the effect of system variables. This is primarily because the differences in fluid opposition sensed in this system are so pronounced that discrimination is relatively easy.

In more generalized application of our invention it may be our purpose to sense differences in fluid kind or condition more accurately than substantial differences in system conditions would permit. Conversely, where kind and condition of the fluid are already known, the sensing of system conditions may be our primary purpose. In units which we will show and describe, we provide means whereby specialized system or fluid sensing requirements may be more conveniently met.

Unit 50 of FIG. 5-1, although somewhat like that of FIG. 1-1 in general construction, has substantial differences which we will show. In unit 50, as before, a body or main housing 500, of low carbon steel and generally rectangular tubular section, contains a main or driving coil 51 wound upon insulating form 511, which is carried by and upon tube or barrel 52, preferably of austenitic stainless steel. Barrel 52 traverses the section of housing 500 and is carried by and between bore 518 of housing 500 and low carbon steel sleeve 514, which is carried within bore 515 of housing 500. Low carbon steel ring 516 augments magnetic transfer of bore 518 and confines coil form 511 longitudinally.

In unit 50 of FIG. 5-1, flow is in a sense opposite to that of unit 10 of FIG. 1-1; so that the inlet body 56 appears at the right of the figure; and, as we shall develop, flow through unit 50 is, except in a modification also to be shown, externally produced.

Inlet body 56, of optional material, is retained against housing 500 by retainer 563, of optional material, which is in turn secured to housing 500 by screws, not shown. O-ring 561 seals between barrel 52, housing 500 and inlet body 56. Gasket 562 protects against dirt. Within bore 566 of inlet body 56, barrel 52 retains inlet valve body 541, which in turn retains washer 565 and screen 564 against the bottom of the bore. Port 560 is adapted to receive an external fluid line. Valve assembly 54 comprises body 541, poppet 540, which seats against and is carried within body 541, valve spring 542 and spring retainer 543, secured to poppet 540. Ports 5401 and 5402 carry fluid to the seat of poppet 540.

Exit body 53 is secured to main housing 500 by screws, not shown, and sealed by gasket 531. Within exit body 53 is carried low carbon steel sensing coil cup 590, which surrounds barrel 52, makes a close approach to housing 500 and sleeve 514, and carries within it sensing coil 59. This coil is wound upon insulating form 591 and compresses O-ring 539 to seal barrel 52 and sleeve 514. Exit bushing 535 threads into exit body 53, sealed by O-ring 532 and provides a base, through screen 538 and ring 537 for buffer spring 533, which in turn bears against buffer plate 55. Plate 55 is ported at 550 and bears against the end of barrel 52. Bushing 535 is ported at 536 to receive a fluid exit line.

Low carbon steel plunger 58 is fitted closely but slidably into barrel 52 and is through-ported at 581 and 582. It is urged into rest position shown by return spring 580, which is carried between valve body 541 and end 583 of plunger 58.

In normal action following electrical energizing of main coil 51, plunger 58 moves forward into space 520 to close the magnetic gap therein. Action of the main magnetic driving circuit is similar to that of unit 10, FIG. 1-1.

In considering the functioning of unit 50 as related to the external system with which it may be connected, we will first return to the unit of FIG. 1-1 in order that the differences between these units may be developed.

Unit 10 is a through-pumping device in which a plunger 18 displaces fluid positively at its forward or advancing end during a magnetic driving and fluid sensing impulse, and negatively at its receding end. During the time of this movement valve 17 within the plunger remains closed, leaving substantially no flow of fluid past the plunger. Therefore we may consider that the fluid opposition to motion of the plunger is the sum of the two separate oppositions forward and rearward of the plunger. Forward of the plunger the fluid contributing to opposition is that within space 120 and whatever volume past valve 15 is so confined that substantial flow within it may occur in response to the motion of the plunger. Thus, for example, exit line 334 of FIG. 3 may be considered a part of the fluid confining means affecting forward opposition to plunger displacement, so long as this line is of sufficiently small section to require development of a significant velocity of flow within it at the time of forward displacement. On the other hand, exit line 334 would not be considered as a part of the fluid confining means affecting forward opposition if its section were so large as to require only insignificant velocity of flow to absorb forward displacement of the plunger.

At the rearward end of plunger 18 the situation is opposite, in the sense that motion of the plunger may be satisfied only by a following flow through valve 14. In this case the volume of line 333 and tube 332 become a part of the effective confined volume on the same basis and to a similar degree as that of line 334.

At either end, confined volume may be simply defined as that contributing to opposition to fluid displacement of the plunger or equivalent displacing element.

During the "OFF" or de-energized period, fluid transfer between opposite ends of the plunger 18 occurs through valve 17 as the plunger is returned by spring 180; but at this time no flow will be required past valve 14 or valve 15; unless the external fluid system is such as to impose a forward fluid flow through the unit.

Portions of a fluid system affecting fluid opposition may be defined as those within a sensing unit and those external to the unit through which fluid may be significantly driven by action of the displacement element.

As already indicated, unit 50 of FIG. 5-1 performs no pumping function, nor is fluid flow required in external lines in response to motion of the displacement element. Flow through unit 50 must be produced by external means. If the action of such means is such as to produce a flow through unit 50 and valve 54 during forward motion of plunger 58, opposition to motion of the plunger is felt as a pressure difference between forward and rearward ends as a function of the restriction offered by passages 581 and 582 and of the rate of flow. It is additionally a function of the kind and physical condition of the fluid. In a particular application of unit 50, either the rate of flow or the kind and condition of the fluid may known or constant; in which variation in fluid opposition sensings may be considered as responsive to unknown or variable conditions.

Another possible operating condition is that of an interruptible flow. In such a case, forward urging of the unit plunger 58 may be opposed by a pressure difference between plunger ends of sufficient magnitude to overcome through flow and permit valve 54 to close. In this condition, fluid within the unit becomes isolated from that of the external system during sensing and through flow ceases; sensing then becomes responsive only to fluid kind and condition.

It will be remembered that, in unit 10, the EMF generated within sensing coil 19 reflects the rise in flux linking this coil during forward motion of the plunger. Essentially the plunger serves as means for transfer of flux derived from the main magnetic driving circuit linking main coil 11 from a path not linking coil 19 into one which does link this coil. As previously noted, a rising flux in coil 19 causes a generation of a relatively low EMF in this coil at the time of turn-on of main coil 11 ($2_i$), reflecting the low degree of magnetic coupling between the main magnetic circuit and that linking coil 19 when the plunger is in starting position. Since advancing of the plunger increases this coupling, the induced voltage in coil 19 resulting from forward motion of the plunger is that which accompanies a rising flux; thus, the sense of induced EMF during forward motion is the same as that of turn-on.

With the unit 50 of FIG. 5-1, we have employed a construction which changes this condition. Forward of the plunger 58 there is only a simple transfer of main magnetic flux, occurring across the space 520 from the plunger and into ring 516, bore 518 of main housing 500 and inlet body 56. Rearward of plunger 58 the flux divides into two paths: one through sleeve 514 to housing 500, not linking sensing coil 59; and one through bore 5900 and sensing coil cup 590 into main housing 500, which does link coil 59. In FIG. 6-2 curves typical of EMF induced in coil 59 are shown for conditions of varying opposition to plunger motion as we did earlier in FIG. 2-2; the sensing being that of coil 69 as indicated in FIG. 6-1, in which the coil terminals are in a reverse sense from that of FIG. 2-1. Coil 69 of FIG. 6-1 is equivalent to coil 59 of FIG. 5-1.

It will now be noted that turn-on EMF $6_i$ now appears in the opposite sense from that of the earlier figure; since coil terminals have been reversed, and that EMF $6_i$ is of much greater magnitude than $2_i$ of FIG. 2-2. This is because plunger 58 begins in a position of maximum coupling of coil 59 with the main magnetic circuit. As the plunger moves forward during its activated period, its rearward end 589 withdraws from its close engagement with bore 5900 and thus de-couples coil 59 progressively from the main magnetic circuit. The normally rising flux now becomes a falling flux, with a reversal in the polarity of the generated signal. As might be expected, the timing of this reversal and of attainment of maximum sensing EMF varies with the rapidity of magnetic disengagement, as does the magnitude of this signal.

The action of unit 50 just described will hereafter be called "falling flux" to distinguish between it and the action of unit 10, which we will hereafter call "rising flux".

Sensing curves for various degrees of fluid opposition are numbered 621, 622 and 623, corresponding with those previously numbered 221, 222 and 223 in FIG. 2-2. However, it must be emphasized that these curves represent the effect of fluid opposition only and not necessarily the same system or fluid conditions between one unit and the other.

Sensings from coil 59 may be employed for discrimination in the circuit of FIG. 4, with the following provisions: first, polarity of the signal must be observed so that the actual sensing signal may depress the voltage at tie point 490 (or 499) as before; gating may be used as before, subject to adjustment of times to separate signals according to the attainment of their triggering potentials; provision must be made, when gating is not employed, to prevent false triggering by a turn-off signal, which may be done in the way which we will now consider.

Contained in FIG. 4 but not previously described is block 47, which fulfils this purpose with discriminator block 46, it being noted that this block does not employ gating means such as block 45, which controls the timing of signals which may trigger block 44; although of course such means might be provided for block 46.

Block 47 serves to lock out a turn-off signal such as 624, whenever of sufficient magnitude to produce the EMF required to trigger block 46, this turn-off signal being strongest when the motion of the unit plunger has been least.

In block 47 transistor 471 connects through resistor 472 with Vcc at its collector, and through diode 4990 to tie point 499, also at its collector. At its base, transistor 471 connects through resistor 473 to terminal 3 of timer 445. Whenever timer 445 is in high state, which will occur during a time of activation of block 44 and unit 42, transistor 471 is driven and its collector substantially brought to the potential of its emitter, which is carried to negative (V−). Thus it does not, during the time of activation of unit 44, inhibit a signal response at tie point 499. At the time of turn-off of unit 42, timer 445 goes low at terminal 3, removing driving voltage at the base of transistor 471 and thus ending the drain through this transistor of current derived through resistor 472 from Vcc. Voltage Vcc then becomes effective through diode 4990 at tie point 499 and serves to block out any signal from unit 42 thereafter.

As before, we could choose to employ re-shaping of the generated signal of a falling flux unit, as by a circuit such as that of FIG. 2-3, the terminals being appropriately reversed. The usefulness of such a re-shaping circuit is generally equivalent to that already noted in regard to rising flux signal generation.

The circuit of FIG. 6-3 is similar to that of FIG. 2-3, except that the terminals are reversed to reflect the changed polarity of the primary sensing signal; here read across terminals 69a and 69c. Sensing coil 69 corresponds to falling-flux sensing coil 59 of FIG. 5-1. Diode 690 now suppresses the initial or turn-on portion of the primary signal $6_i$ (FIG. 6-2). Capacitor 630 and resistor 631 correspond to capacitor 230 and resistor 231 of FIG. 2-3. As before, the ratio of peak signal magnitudes is increased by re-shaping by this circuit, as seen by the curves 641, 642 and 643 of FIG. 6-4, corresponding to curves 621, 622 and 623 of FIG. 6-2. Likewise, signal duration above the zero line is diminished by re-shaping; thus rendering the separation of signals, either as observed or by discriminator means, easier.

As before, block 47 of FIG. 4 or gate timer block 45 will serve as needed to lock out the effect of turn-off signals such as 644 of FIG. 6-4.

Although we have shown and described various means for responding to fluid and system conditions, for signal generation and for signal employment as in FIG. 4 and in relation to the physical requirements of a dual-pump system as in FIG. 3, we have already made the point, in discussing fluid applications of the unit of FIG. 5-1, that the application of this unit and, indeed, that of FIG. 1-1 as well, is not to be so narrowly restricted. On the contrary, it is our primary purpose to sense fluid opposition wherever it may be found and to employ sensings either for information or for control as may fit the requirements of any fluid system to which our invention may be applied.

In previous embodiments of our invention we have shown units adapted to through flow, which may be for system purposes as well as a means for purging and replacement of fluid to be sensed. We have shown units which were self-purging and, in contrast, units requiring an externally-produced purging flow. In units now to be shown and described, through flow is not required; instead, we accomplish purging as a reversing exchange between the unit and a point of fluid exchange for which fluid sensing is to be carried out. In these units, response is primarily to fluid kind and physical condition as it occurs at the point of fluid exchange; although response may be conditioned by system pressure as it affects the compressibility of a gas or vapor.

FIGS. 7-1 and 7-2 show alternative forms of a flange-mounted sensing unit, representative adaptations of which will later be shown. As will be seen, reverse-flow exchange which these units employ makes necessary the placement of these units relatively close to a point in a fluid system for which sensing is desired. In such applications flange mounting is a convenience, in part because it eliminates any necessity for the provision of external fluid lines; closeness to the point of withdrawal also becomes relatively easy.

Unit 71 of FIG. 7-1 has a main housing 7100 of generally rectangular section and of a magnetic material such as low carbon steel. Within this housing is a main or driving coil 711 of enamelled copper wire or equivalent, wound upon insulating coil form 7111. Coil 711 and its form are carried upon non-magnetic barrel 712, which traverses the section of housing 7100 and is carried at its outer end by magnetic cap 716 and at its inner end by retaining cup 713, also magnetic; a small diametral clearance is maintained between barrel 712 and bore 7119 of housing 7100.

Within barrel 712 is the fluid displacement element, plunger 718, of low carbon steel. Rings 7187, of non-magnetic material, seal between plunger 718 and barrel 712, and are retained by magnetic ring 7189; this construction is similar to that of unit 10 and sensing transfer of flux occurs in the same manner. At its forward end 7188, plunger 718 is urged toward its rest position shown by return spring 7180, which bears against the bottom of cup 713. This cup is bored at 7130 to give an essentially open passage for fluid into space 7120 from the outer space surrounding this cup; since no substantial opposition of fluid flow occurs through this opening, the forward end 7188 of plunger 718 is not, in this construction, effective as a fluid displacement element for the purpose of sensing fluid opposition.

Passing freely through bore 7130 is non-magnetic fluid extension tube 7181, pressed into end 7188 of plunger 718 and directly communicating with passage 7184 of plunger 718. Tube 7181 and passage 7184 thus provide an uninterrupted path or duct for the passage of fluid between tube end 7182 and the receding end 7186 of plunger 718, which bottoms in cap 716. Because of its length and limited section, this path or duct does offer substantial restriction or opposition to fluid flow, thereby making the receding end 7186 of plunger 718 effective as a fluid displacement element for the purpose of fluid sensing.

When driving coil 711 is energized, plunger 718 is urged to move forward into space 7120; while at the same time to create an open volume at its receding end 7186 which may only be filled with fluid by flow through tube 7181 and passage 7184. Preceding this action, pressure is equal at both ends of plunger 718; but, as forward motion proceeds, opposition to fluid flow into the receding volume creates a pressure or force difference between opposing ends of plunger 718 in opposition to its motion; since pressure at the forward end 7188 does not substantially change.

Since this unit 71 is not subjected to through flow or to system pressure differences, what it senses is principally kind and physical condition of the fluid entering at tube end 7182. At the end of a sensing motion of the plunger 718, fluid which has been drawn into the unit 71 returns along the path by which it had entered, by return of plunger 718 under the urging of spring 7180.

In completing the assembly of this unit, we note that cap 716 is secured to magnetic flange 7160, through which screws 7106 pass into housing 7100. O-ring 7162 seals barrel 712 within cap 716. Magnetic transfer occurs between plunger 718 and cap 716 and thence to housing 7100 through bore 7161 and flange 7160.

At the inner end of unit 71, ring 7101, of a relatively soft non-magnetic material, combines with forward end 7163 of cap 716 to confine longitudinally coil form 7111. Non-linking sensing end flux transfer occurs between end 7188 of plunger 718 across space 7120 to the wall 7102 of housing 7100 and bore 7119. Sensing transfer occurs as in unit 10, through magnetic housing 7190, mounting flange 7139, cup 713 and across space 7120 from the end 7188 of the plunger 718; this path links sensing coil 719 magnetically. O-ring 7134 seals between housing 7100, cup 713 and barrel 712. The sensing is by rising flux as in unit 10 and sensing curves are those of FIG. 2-2. Choice of rising flux sensing is here a matter of design convenience; a falling-flux construction as in unit 50 could have been employed to either unit 71 or 72.

Initial freedom of movement of plunger 718 is insured by the interposition of non-magnetic separator disc 7168 between the end 7186 of the plunger and the bottom of cap 716; otherwise, a possibility would exist of sticking or hanging up of the plunger at the time of energizing of coil 711 because of concentration of flux transfer at this point, were there to be no physical or magnetic separation between the plunger end and the material of the cap 716.

Unit 72 of FIG. 7-2 has a main housing 7200 of generally rectangular section and of a magnetic material such as low carbon steel. Within this housing is a main or driving coil 721 of enamelled copper wire or equivalent, wound upon insulating coil form 7211. Coil 721 and form 7211 are carried upon non-magnetic barrel 722, which traverses the section of housing 7200 and is carried at its inner end by magnetic cup 723 and at its outer end by magnetic cap 726. As before with units 10 and 71, a small diametral clearance is maintained between barrel 722 and bore 7219 in wall 7202 of housing 7200.

Within barrel 722 is the fluid displacement element, plunger 728, of low carbon steel. Non-magnetic rings 7287 seal between plunger 728 and barrel 722, and are retained by magnetic ring 7289. At its forward end 7288, plunger 728 is urged toward its rest position shown by return spring 7280, seating in bore 7220 of cap 726.

Magnetic linking of sensing coil 729 occurs through sensing housing 7290, flange 7269 and cap 726; all of low carbon steel. These parts, O-ring 7262 and coil 729 upon form 7291 comprise a sensing end assembly secured to housing 7200 by screws, not shown. Wall 7202 and bore 7219 provide the non-linking portion of the forward flux transfer. Ring 7201, of soft non magnetic material, confines coil form 7211 longitudinally against cup 723, which is itself secured to magnetic flange 7231; this assembly is secured to housing 7200 by screws, not shown. O-ring 7234 seals barrel 722 into cup 723. Cup 723 is bored at 7230 to give a substantially open fluid passage to space external to cup 723. Non-magnetic separator disc 7238 provides the required initial separation between cup 723 and end 7286 of the plunger to prevent magnetic sticking of the plunger at the time of energizing of coil 721.

In the construction of unit 72, the receding end 7286 now becomes open and unrestricted; therefore it is not effective in fluid opposition to motion of the plunger; instead, effective opposition is now that of the forward end 7288, which moves to and from space 7220.

As before, fluid is exchanged with the fluid system served at the end 7282 of tube 7281, which is pressed into plunger 728 and is non-magnetic. Tube 7281 delivers to passage 7284, which in turn delivers through tube 7282 into space 7220. Tube 7282 is non-magnetic and pressed into the end 7288 of the plunger 728. It serves the function, when the unit is employed in an attitude such as that shown, to purge or scavenge the full extent of space 7220 of gas or vapor by moving into the upper portion of this space on its forward stroke. Together, tube 7281, passage 7284 and tube 7282 provide a restricted passage or duct to offer a substantial controlled opposition to fluid flow under the forward urging of plunger 728 when coil 721 is energized.

We will now draw a distinction between the action of this unit 72 and that of unit 71. In unit 71, the flow-limiting or restricted path for fluid flow lies between the external system point of exchange 7182 and space at the receding end 7186 of plunger 718. Activation of the magnetic circuit driving this plunger causes a reduction in the fluid pressure from that initially present at plunger end 7186 by forward urging of the plunger; by an amount variable according to the opposition of the fluid to flow from tube end 7182 into the space left by forward motion of the plunger end 7186. Since forward end 7188 is ineffective in fluid opposition because of free ventilation through 7130, unit 71 senses on expanding volume only.

Depending upon the kind and physical condition of fluid present at the end 7182 of tube 7181, fluid opposition to the maintenance of normal pressure at plunger end 7186 will depend on the compressibility (or expandability) of the fluid, upon its density or viscosity, and upon vapor pressure of the fluid. The effect of these variables has already been discussed in connection with earlier units; except that of vapor pressure.

Whenever the vapor pressure of a liquid fluid medium approaches the pressure of the fluid system, a reduction of pressure greater than the difference between system and vapor pressures will cause boiling of the liquid. Sharp activation of plunger 718 will normally cause such a reduction in pressure in the space left by end 7186, unless following flow through tube 7181 is sufficiently free to prevent the development of such a pressure reduction. Thus, we may make unit 71 sensitive to vapor pressure of a liquid by appropriately determining the section of tube 7181 and passage 7184. Higher vapor-pressure liquids then give a higher following pressure at plunger end 7186; lower vapor pressure liquids a lower following pressure. Differences then become reflected in variations in the developed motion of the plunger 718. As will be shown in an application to be described, the same unit may sense variations in liquid viscosity or density, variations in vapor pressure of the liquid, and the replacement of the liquid by a gas or vapor, to produce sensings useful for information and for the control of system functions.

In contrast, unit 72 senses on forward or pressure-increasing motion of its plunger 728, which is driven in a direction to reduce rather than to expand the space 7220, which communicates through tubes 7282 and 7281 and passage 7284 with the fluid of the external system as received at tube end 7282. Thus, this unit 72, although responsive to all other variables, does not respond as does unit 71 to the effect of vapor pressure.

FIG. 7-3 shows a representative application of such a unit as 71 or 72. In the figure, a fluid sensing unit, either equivalent to unit 71 or 72, is shown as unit 73. It is mounted by its flange 7339 against a pad 7331 incorporated in the wall of an engine crankcase or sump, similar to 33 of FIG. 3; here called 730. Pad 7331 is through-ported at 7330 to receive cup projection 733 of the unit 73 and to allow entry of sensing tube 7381, equivalent to tube 7181 or 7281. In this application we will assume that sensing tube end 7382 is normally immersed in oil throughout its range of movement in following the stroke of the unit plunger. Typically, the utility of this unit lies in sensing the quality of oil in the crankcase. Thus, at a time when the engine has been out of operation, the oil in the sump may have become cold; in cold climates, possibly too cold and too high in viscosity for safe engine operation under power. Unit 73 may identify this condition with the production of a sensing signal of relatively low magnitude and late in timing. As the oil in the sump becomes warmer in operation, unit 73 may indicate a lowered viscosity which would normally result. As normal operating conditions are attained, unit 73 would indicate operating viscosity of the oil. If the oil should become excessively heated, the unit might indicate abnormally low viscosity. If severe dilution exists in the oil by a medium such as a light fuel having ascending vapor pressure, a unit such as 71, which responds to high vapor pressure, would indicate this condition by a still stronger signal occurring early. Should the supply of oil become so depleted that tube end 7382 begins to withdraw from the oil surface, air or other crankcase gas would enter the unit, which would then give a still stronger and earlier signal indicative of the presence of a gas rather than a liquid. All of the foregoing condition signals then would constitute a spectrum of possible fluid conditions to which more than a bi-level response might be appropriate.

Should it be desired not to respond to high vapor pressure but otherwise to the varying fluid conditions to be met, we would choose to employ a unit such as 72, which has no vapor pressure response.

Another application employing the possible range of response of unit 71 or 72 is shown in FIG. 7-4, the sensing unit being here called 74. In this figure, 740 indicates a through-passing liquid line or duct having a top- or side-located pad 7431 to which unit 74 is secured by means of its mounting flange 7439. As before, cup 743 may project into line 740 through port 7430, as may sensing tube 7481, having end 7482 in the fluid stream, which becomes a point of exchange. Typical of the utility of this application is that of sensing the quality of an oil fuel in a supply line to an engine or other fuel-using equipment. Viscosity sensing which either unit 71 or 72 may afford will permit us to indicate and if desired to control through additional system means of conventional kind the viscosity of the oil, as by heating. Should vapor pressure of the fuel become excessive, as in the case of over-heating, a unit such as 71 may indicate this condition. Either unit 71 or 72 will indicate the remaining possible conditions, including the possible presence of gas or vapor in the line 740.

We have emphasized in the description of units 71 and 72 the uses of single-end sensing, either in an advancing or receding mode. We now must point out, however, that units of other construction, such as unit 10 of FIG. 1-1, are adaptable to be employed in the same way by so sizing supply and exit lines as to make either alone effective in fluid opposition, the other being made so short or so open, or both, as to render the unit end which it serves virtually ineffective in opposition to fluid flow. In other words, a "confined fluid space" might be effective at either end of a unit alone or at both, as desired.

Just as unit 10 of FIG. 1-1 could be made effective at a single end only in fluid opposition, so either unit 71 or 72 could be made effective simultaneously at both ends. In unit 71 we might choose to make passage 7130 small enough to offer a substantial opposition of fluid flow around tube 7181. In unit 72 we could choose to limit substantially the size of bore 7230. If any unit senses in response to fluid opposition at both ends, then, to the degree that the receding-end opposition is effective, the unit will be responsive to the effect of high vapor pressure; although not so effective as when sensing in response to receding-end opposition alone.

The range of fluid conditions to which a unit may be made responsive may be varied by varying the chosen degree of fluid opposition. Thus, when we wish to adjust the range of response to a particular range of liquid viscosities, we may do so by adjustment of the length and section of the paths through which the liquid must pass during a sensing impulse.

In FIG. 8-1 we show a circuit for the production of a continuously ranging or analog output responsive to fluid opposition, adapted for insertion into the circuit of FIG. 4. Sensing coil 819, which corresponds to coil 419 of FIG. 4 and could be either of a rising flux or falling flux unit, is based at voltage Vcc and connected to give a signal of lowered conventional level at its terminal 819b. In the present figure this coil could also represent any of the shaping configurations already shown. Tie point 490 and diodes 491, 494 and 495 of FIG. 4 here become tie point 890 and diodes 891, 894 and 895. Resistor 896 is here inserted in the connection between terminal 819b and tie point 890 to make the impedance of the tie point loading upon coil 819 relatively large compared with that of the coil itself, in order to permit maintenance of signal voltage at the coil terminals 819a and 819b.

Directly across these terminals we connect circuitry for registering peak levels generated by sensing signals in coil 819. Capacitor 8192, resistor 8193 and voltmeter 8194 all connect to terminal 819b. Diode 8191 delivers sensing signals at substantially peak value to capacitor 8192, which stores this voltage between generated signals. Voltmeter 8194, which could be either an analog device or a digital equivalent, reads this stored value. Resistor 8193 provides a slow bleed to permit the read value to follow declining sensing signals. It will be evident that we are now reading a potential range of peak signal values, appropriate to a range of conditions of fluid opposition. Obviously, the signal read by voltmeter 8194 could also be used by conventional means for control of a system function. The discriminator action of the circuit through tie point 890, carried out as in FIG. 4, is independent of the ranging circuit read at 8194 and becomes optional.

In FIG. 8-2 we show a way of obtaining a ranging or analog output voltage dependent on timing of the sensing signal rather than upon its magnitude.

In the figure, we show a master timer 825, corresponding to timer 435 of FIG. 4. It is assumed that this timer is connected to activate a unit such as 41, incorporating a sensing coil such as 419. In FIG. 8-2 this coil appears as 829; it may be any of the coils or shaped coil circuits already shown, and is connected in a sense to allow a fluid sensing signal to drive transistor 820 through resistor 826 whenever of sufficient strength, such as that of line $M_2$ of FIG. 2-2, relative to signals such as those shown; in this case, any of the signals 221, 222 or 223 could activate transistor 820. When this occurs, current derived from Vcc through resistor 827 passes to point 2,6 of master timer 825, raising the voltage at this point and across capacitor 824 above threshold level and terminating the high state period of timer 825. Thereupon terminal 3 goes low.

FIG. 8-3 shows diagramatically the voltage at this terminal 3 of timer 825. At the beginning of the active cycle, this becomes $V_H$, which is that of its normal high state, or the "ON" period of operation. This voltage, beginning at time s, continues through period $t_H$ to time x, which is the time of turn-off of timer 825 as just described; this time period will normally be lower than that determined by the resistor 823 as previously explained in connection with FIG. 4, unless sensing signals fail to be generated during the normal period. During the "OFF" or low-state period of timer 825, here shown as $t_L$, the voltage at terminal 3 is that of low state, $V_L$. This period $t_L$ continues until current through resistor 823 to terminal 7 has reduced the voltage at 2,6 to trigger level and a new cycle begins.

The purpose of the ranging circuit of FIG. 8-2 is to develop a voltage at voltmeter 8280 which is a simple function of the time to turn-off of the unit by the sensing signal. In addition to its working output, terminal 3 connects to meter 8280 through resistor 828. Capacitor 8281, in parallel with the meter, charges through resistor 828 during the high-state period $t_H$ and discharges during the low-state period $t_L$; terminal 3 is during this period substantially at $V-$. The value of resistor 828 is made sufficiently high in relation to that of capacitor 8281 so that each high-state period contributes but little to the charge of the capacitor. When the amount of charge in high state becomes equal to the discharge at low state, capacitor 8281 is in equilibrium at voltage $V_A = V_H(t_H/t_P)$; thus this circuit gives essentially an averaged voltage smoothed from successive sensings of fluid opposition, in which the potential range of values of $V_A$ is a function of the potential range of degrees of fluid opposition to which a particular unit, as installed into a fluid system, is adpated to respond.

In earlier discussion of the triggering action of a sensing signal, whether for a bi-level or analog function, we have assumed a predictable relationship between signal strength and that required to trigger an output function. Thus, in the circuit of FIG. 4, the voltage required to trigger timer 445, the discriminator, is substantially the difference between Vcc and trigger voltage of this timer; for this purpose we ignore diode drop at 494. A line such as $M_1$ of FIG. 2-2 may represent this voltage in relation to signal strength when it is desired to trigger only on the stronger signals; this relationship we obtain by adjusting the effective number of turns of coil 419, either by actual count of the turns or by over-winding and use of the shunting resistor 4190. We are here concerned only with the relative strength of the sensing signals to the strength requirement for triggering. When we desire a response to weaker signals, we may increase signal strength at the sensing coil, so that the required signal strength to trigger, still the same in actual voltage, becomes relatively less by comparison with signal strength, as with horizontal line $M_2$ of FIG. 2-2.

In FIG. 8-2 the signal strength required for triggering becomes merely that needed to activate transistor 820; so that the same relative signal strength may be achieved with sensing signals substantially weaker than those required to trigger timer 445, either on the $M_1$ or $M_2$ basis.

FIG. 8-4 shows a simple circuit which permits, by adjustment of a potentiometer or the substitution of equivalent resistor values, the determination at will of any desired triggering requirement; so that we may achieve the desired signal strength to triggering requirement ratio by adjusting the triggering requirement rather than the effective signal strength.

The circuit of FIG. 8-4 is that of a voltage comparator. Transistors 841 and 842, which could as well be Darlington pairs, are placed in opposition and connected at their emitters to a common leg to $V-$ through resistor 840. Each is connected to Vcc through a resistor; 8411 for transistor 841 and 8421 for transistor 842. A voltage divider comprising resistors 8424 and 8425, in series between Vcc and $V-$, provides a stable voltage reference at the base of transistor 842. Sensing coil 849, which could be that of any of our sensing units, connects at one end to the base of transistor 841 and at its opposite end to the moving point of potentiometer 8490, which connects between Vcc and $V-$. Normally the potentiometer 8490 will be adjusted to give a higher positive potential at the base of transistor 841 than that provided at the base of transistor 842. Therefore, in normal state, transistor 841 will be driven and transistor 842 will not. Collector voltage at transistor 842 will therefore be substantially at Vcc; at transistor 841, collector voltage will be a lesser value determined by the relative values of resistors 8411 and 840. Adjustment of potentiometer 8490 gives an initial bias or voltage difference between opposing transistor bases as desired; for example, voltage levels such as $M_1$ and $M_2$ could be chosen. Again, the vertical scale of these lines relates to the scale of the expected signals as before; but, in the present case, we may start with a sensing coil 849 of fixed effective number of turns and achieve a relative signal-strength requirement to trigger a circuit response by adjusting the voltage level at potentiometer 8490.

At 8451 we show a 555 timer comparable to the master timer of previous circuits, requiring an ascending voltage at its terminal 2,6 to terminate a high-state period. At 8452 we show a 555 timer which could be any of the discriminator timers of previous circuits, requiring a descending voltage to trigger a high-state period. The necessary capacitors and resistors to determine active periods of these timers are as in previous circuits; time-gating may optionally be included in the case of timer 8452.

The initially high voltage at the collector of transistor 842 is held off from timer 8452 by diode 8423. Likewise, the initially low voltage at the collector of transistor 841 is held off from timer 8451 by diode 8413. When a signal of sufficient strength to exceed the chosen initial bias of the comparator is generated in sensing coil 849, in a direction opposite to that of the bias, the base of transistor 841 ceases to drive and the base of opposite transistor 842 becomes driven from its reference potential. The potentials previously existing at the collectors of both transistors then reverse. The voltage at terminal 2,6 of timer 8452 is driven low, to trigger a high-state period; the voltage at terminal 2,6 of timer 8451 is driven high, to terminate its high-state period. In order that any possible action at timer 8452 may take place before a turn-off signal occurs in coil 849, a short delay in turn-off of timer 8451 is obtained by shunting the initial driving current through resistor 8412 to V− through capacitor 8414. Resistor 8415 gives recovery of capacitor 8414 to zero charge between times of activation.

In typical use, timer 8451 will always be driven low by any signal great enough to activate the comparator circuit; timer 8452 will always be driven high unless the intrusion of a time-gating voltage prevents activation.

In FIGS. 9-1 and 9-2 we show in diagram the manner in which our preferred magnetic sensing means responds to the motion of a fluid displacement element such as the plunger 18 of the unit of FIGS. 1-1, 1-2 and 1-3, which employs a rising-flux magnetic sensing circuit. Numbers are as in those figures.

FIG. 9-1 shows such a magnetic circuit with the plunger 18 in rest or starting position; FIG. 9-2 with the plunger in an advanced position.

In these diagrams the total flux linking the main or driving coil 11 is designated by the letter Z. This flux passes around coil 11, principally through the permeable material of the main or external housing 100 and through the permeable material of the plunger 18 to complete magnetic linkage of this coil. At the forward end of plunger 18 the flux must initially traverse an open or magnetically unsatisfied space 120 of low permeability. Across this space the greater part of the flux Z passes between the plunger 18 and housing 100 by the most direct path X, with a lesser amount of flux passing through the sensing coil 19 by the less direct path Y. As the plunger moves forward following the energizing of the main magnetic circuit by current flowing in coil 11, it at first mainly closes the open space of path X, not linking coil 19. As motion proceeds the closing motion of the plunger increasingly satisfies the open space of path Y which does link coil 19. Thus the flux passing through coil 19 rises, both relatively to that not linking this coil and in absolute terms. An EMF is thereby induced in coil 19 in proportion to the rate of increase in the flux of path Y, which varies with the rate of motion of the plunger 18. This action we call "rising-flux" sensing.

In FIGS. 9-3 and 9-4 we show in diagram a "falling-flux" magnetic sensing circuit, corresponding to that of the unit of FIG. 5-1. FIG. 9-3 shows this magnetic circuit with the plunger 58 in its rest or starting position; FIG. 9-4 with this plunger in an advanced position. Numbers are as in FIG. 5-1.

As before, we designate the total flux linking main coil 51 by the letter Z. As before, the flux at the forward end of the plunger must initially traverse a magnetically unsatisfied space 520 which closes as the plunger advances. In this case there is only one path for the total flux Z across space 520. At the rearward end of the plunger the flux is divided into two paths: X, through the main housing or body 500 directly, not linking sensing coil 59, and Y, linking this coil. In starting position of the plunger, both paths X and Y are closely satisfied and each carries a substantial proportion of the total flux Z. As the plunger advances the magnetic linkage through sensing coil 59 by path Y opens and this flux rapidly diminishes, causing an EMF to be induced in coil 59 in proportion to the rate of change of the linking flux.

It is important to note that sensing depends on the rate of change of flux linking the sensing coil, independently of whether the linking flux is rising or falling. Thus, with appropriate choice of polarity, sensing signals from either type of magnetic circuit give signals essentially equivalent in their correspondence with the motion developed by the unit plunger and therefore in their usefulness as a measure of fluid opposition.

In all the units so far shown and described we have employed as our fluid displacement means a plunger fitted into a cylindrical bore. Our driving means has been magnetic and applied directly to the displacement plunger. Sensing means has also been magnetic and has employed flux derived from the main driving magnetic circuit.

In FIGS. 9-5 and 9-6 we show a fluid pumping and sensing unit in which alternative means are employed. The unit of this figure is shown both to illustrate the generality of our invention and as a combination of means useful and workable in itself.

FIG. 9-5 shows a pumping and sensing unit in combined section and diagram. The fluid displacement element is a diaphragm of suitably flexible material, such as reinforced synthetic rubber, designated by the numeral 98. This diaphragm is secured around its periphery between two fluid housings 981 and 982. Housing 981 provides confinement for space 980 adjacent to one side of the diaphragm 98. This space connects through ports 9801 and 9802 to inlet and valve assembly 983 and outlet and valve assembly 984, which provide for entry of fluid from an external system and its return to the system, as well as inlet and exit valving required to complete a pumping function whenever diaphragm 98 moves into or away from space 980.

The second or opposite side of diaphragm 98 faces open space 9820 in housing 982 which is conveniently vented, as to atmosphere, through port 9821. It will be evident that fluid pumping and fluid opposition will be a function of displacement by the element at its side in communication with space 980 only.

The required urging of diaphragm 98 is provided by the action of cam 910, driven by conventional external means, and carried conventionally within drive housing 91. Housing 91 is joined conventionally to intermediate housing 92, similarly joined to housing 982.

Housing 92 is bored at 920 to receive slidably cam follower 911. Follower 911 is bored at 9110 to receive slidably the large end 930 of connecting rod 931. Rod 931 and nut 932 capture plates 933 and 934, which clamp securely the diaphragm 98, so that the diaphragm 98 and rod 931 may move only together. Spring 938 urges rod 930 and diaphragm 98 away from chamber 980 and toward cam follower 911. Spring 913, placed between follower 911 and rod end 930, opposes spring 938 to define between them a starting position for the rod and diaphragm assembly. Counterclockwise rotation of cam 910 from the position shown causes follower to lift, compressing spring 913 and causing it to urge the rod and diaphragm assembly upward; movement of the diaphragm 98 into chamber 980 causes expulsion of fluid out of this chamber through exit valve 984 but by a variable amount and at a variable rate according to the opposition of the fluid. The movement of the rod and diaphragm assembly varies similarly.

Movement of rod 931 is sensed electrically by transducer assembly 94, which could be any of a variety of devices commonly used for this purpose. In the present case, we choose to employ a potentiometer. Arm 941 is pivoted at 942 and passes through port 923 in the side of housing 92. Rod end 930 is drilled at 9300 to receive closely ball end 943 of arm 941. Contact assembly 944 at the opposite end of rod 941 sweeps potentiometer element 945, of any suitable electrical resistance. An external electrical potential or voltage is applied to the terminals 945a and 945b of element 945 by suitable means such as battery 95. Contact assembly 9420 brings out an electrical connection to arm 941, which carries a voltage variable according to the position of arm 941, which follows motion of the rod and diaphragm assembly at drive pocket 9300 and transfers motion to the sweeping contact 944. This voltage may be read by conventional means across output terminals 90a and 90b, or resolved by electronic means as with units already shown for further information or control.

As cam 910 continues in its rotation, follower 911 returns to its original position, causing spring 913 to relax and producing a net force in a direction to urge the diaphragm and rod assembly back to its original position. Return of this assembly may vary with the opposition of the fluid entering through valve 983, both in timing and amount, comparably to its action during the previous forward motion.

We note here that we may obtain a useful sensing applicable to the inlet and its associated external path of fluid flow by employing the electrical characteristics of the signal generated by potentiometer transducer 94 during this motion. Similarly, the signal generated during the advancing motion of the diaphragm 98 is responsive to the opposition of fluid flow from chamber 980 through outlet valve 984 and in the associated external fluid path from the outlet. This action, in allowing separate evaluation of inlet and outlet fluid opposition, is not duplicated in the units previously shown and is thus a feature special to the present unit. It would be obvious that a comparable result would be obtained were a plunger or piston to be substituted for the diaphragm 98 in this unit.

FIG. 9-6 shows a simple alternative way to respond to the position of the rod and diaphragm assembly. Arm 9410, pivoted at 9420 as before, responds in the same way to diaphragm movement. Arm 9410 carries contact 9440, which engages contact assembly 9441 at the rest position of the diaphragm to complete an electrical circuit from terminal 90c through arm 9410 and contact assembly 9421 to terminal 90e. As motion of rod 931 begins, this circuit opens. A similar circuit between terminal 90e and terminal 90d is completed when contact 9440 strikes contact assembly 9442, which will occur whenever the stroke of the diaphragm and rod assembly is sufficient. Thus, this method of electrical signalling responds according to the completion of a required diaphragm stroke, for essentially a magnitude sensing, and to the timing between release of contact 9441 and engagement of contact 9442 for elapsed-time measurement of the motion of the diaphragm, equivalent to elapsed-time signals of the units shown earlier. As before, signals may be used for information or for control.

To illustrate most broadly the generality of our invention we offer FIG. 10, which shows in diagram the essential means comprising a fluid sensing system employing continuously moving rotary displacement means; in this case driven by an electric motor of known power, speed and torque characteristics. Motor 01 in this diagram may, for example, be of a direct-current or universal type employing a conventional series winding and having widely varying speed and torque characteristics. It is mechanically coupled to a pump 02, which, for example, could be a positive-displacement unit employing vanes or interlocking rotor elements creating an essentially continuous fluid displacement which causes fluid which may enter inlet port 03 to be urged toward outlet port 04. Any pressure difference which may exist in an external circuit between these ports may be read by gage 05, and is the pressure difference developed between these ports by pump 02. The torque required to develop this pressure difference, plus that required to overcome pumping losses within the pump, is that required of motor 01, and varies both with the kind or quality of the fluid pumped and with the state of the external fluid system in a manner essentially the same as previously dealt with at length in connection with the units of earlier figures.

To identify this torque as a measure of fluid opposition at pump 02, we may choose to measure the power drawn by the motor from an external power source through terminals 0a and 0b by means of meter 011; or we may instead simply read the speed of the motor as it may vary with fluid opposition by means of tachometer pick-up 09 and readout means 091.

We have shown in the foregoing specification a variety of means for carrying out our invention. These means and our combinations of them have in common that we employ positive-displacement elements to urge a confined fluid into displaced flow; that the variable opposition of the fluid to such displacement results in a varying motion developed by the displacement element; that we sense the motion of the element so developed to obtain electrically a signal useful in responding to such varying motion and therefore to the opposition of the fluid. In some cases we employ our fluid displacement means also to pump a fluid. In other cases we respond to the presence of a fluid introduced by external means. In some cases we employ our fluid displacement means to purge and replace fluid to be sensed, without thereby performing a fluid pumping function. In most of the applications shown we have employed a plunger as our displacement element, but have also shown that other fluid displacement means may be used. In most of our applications we have employed magnetic driving means for our fluid displacement element; but we have also shown that other means may be employed. In most of our applications we have employed electromagnetic sensing means; but we have also shown that other equivalent means could be employed. In most of our applications we have employed reciprocating fluid displacement elements; but we have also shown that rotary elements could be employed.

In the broadest usefulness of our invention, we have shown pumped systems in which identification of fluid opposition may be primarily for the control of the system. We have also shown devices primarily for the purpose of responding to the kind or quality of the fluid present, or to the operating state of the associated fluid system, whether for information or for control, or both. The uses to which our invention may be put cannot be limited to the few examples which we have had space to show.

GLOSSARY

As far as possible, we have attempted to use descriptive terms in their commonly understood meanings. However, a number of such terms have, as applied to our invention, meanings which may go beyond common usage. In some cases, terms used will already be clear from our descriptions and from context. However, we will here give a list of some for which definition is needed.

FLUID

A substance which may be pumped or otherwise caused to flow in a fluid path or duct. Substances otherwise fluid may contain solids, so long as such solids remain suspended or entrained in the fluid medium.

FLUID SYSTEM

Any physical system which contains one or more fluids. Such a system may contain open or closed reservoirs or fluid ducts.

FLUID DISPLACEMENT ELEMENT

A mechanical element able by its motion to displace a fluid, either positively or negatively.

FLUID DISPLACEMENT

Movement of a fluid, as by a fluid displacement element, in a direction to increase or decrease locally its available volume. An advancing motion of an element into the fluid decreases its available volume and is called positive displacement. A receding motion of the element increases its available volume and is called negative displacement. A single mechanical element may combine advancing and receding portions which may be considered as separate elements within a fluid system.

CONFINED DISPLACEMENT SPACE

A volume which may contain fluid in communication with a fluid displacement element in which the fluid may offer opposition to fluid displacement. Such opposition may be overcome by compression or expansion of the fluid or by fluid flow toward or away from the displacement element. This confined space does not for our purpose include portions of a fluid system which may be in communication with a displacement element but which are so open as to permit displaced flow without offering substantial opposition thereto.

SENSING UNIT

A physical construction including fluid displacement means, means for confining fluid to be displaced, force means for urging fluid displacement, and means for sensing the motion of the fluid displacement means as it may vary with varying opposition of the fluid. A sensing unit may be separate structurally or may be combined with other structure.

PUMPING AND SENSING UNIT

A sensing unit adapted to pump the fluid sensed, whereby a fluid system pumping function may be carried out.

EXTERNAL FLUID SYSTEM

The remainder of a total fluid system with which a sensing unit or a pumping and sensing unit may be connected, including fluid lines to or from the unit. However, such lines may form portions of the confined displacement space for the purpose of defining fluid opposition.

IN-LINE UNIT

A sensing or pumping and sensing unit to which fluid may be supplied by one line or duct and from which it may be delivered to another. Flow may be either in a single direction or in either direction, according to the construction of the unit.

ISOLATED DISPLACEMENT

Displacement within a fluid sensing unit which, during fluid sensing, is so isolated that flow does not occur to or from the external fluid system.

POINT OF WITHDRAWAL

A point or place within an external fluid system from which fluid to be sensed is withdrawn.

POINT OF EXCHANGE

A point or place within an external fluid system from which fluid to be sensed is withdrawn and to which it is returned.

PURGING

The removal of fluid from a confined displacement space; usually followed by replacement of the fluid. In a pumping and sensing unit, purging and replacement are accomplished by the pumping action. An in-line unit lacking pumping capability will normally require an externally produced flow for purging and replacement. A unit purging and replacing at a point of exchange may be self-purging without performing a system pumping function.

We claim:

1. A sensor for responding to the opposition of a fluid to its own physical displacement, said sensor comprising:
    a body having a cavity therein, a flow conduit means enabling entry and exit of fluid to and from said cavity;
    a fluid displacement member comprising a plunger having an axis of movement movable in order to vary the volume within said cavity which is available to be occupied by said fluid;
    force means adapted to give repetitively a known single impetus to said fluid displacement member for the purpose of ballistically moving it repetitively, each time from a known datum point, repetitively to change said volume; and
    sensing means responsive to the motion developed by said member in response to said impetus, as such motion may vary with the varying opposition of said fluid to its own physical displacement by said member, to produce a signal respective to such opposition, said sensing means comprising a coil responsive to change of magnetic flux linking it and thereby to generate a signal proportional to the rate of such change, and magnetizable material integral with said plunger, so disposed and arranged as to cause said flux linking said coil to change when said plunger moves.

2. A sensor according to claim 1 in which said fluid transfer passage means extends through said plunger.

3. A sensor according to claim 1 in which said plunger is moved by said force means to decrease said volume in said cavity.

4. A sensor according to claim 1 in which said plunger is moved by said force means to increase said volume in said cavity.

5. A sensor for responding to the opposition of a fluid to its own physical displacement, said sensor comprising:
- a body having a cavity therein, a flow conduit means enabling entry and exit of fluid to and from said cavity;
- a fluid displacement member comprising a plunger having an axis of movement movable in order to vary the volume within said cavity which is available to be occupied by said fluid;
- force means adapted to give repetitively a known single impetus to said fluid displacement member for the purpose of ballistically moving it repetitively, each time from a known datum point, repetitively to change said volume;
- sensing means reponsive to the motion developed by said member in response to said impetus, as such motion may vary with the varying opposition of said fluid to its own physical displacement by said member, to produce a signal respective to such opposition;
- said flow conduit means comprising an inlet port entering said cavity in fluid communication with one end of said plunger and an outlet port departing said cavity in fluid communication with the other end of said plunger; and
- fluid transfer passage means enabling flow of fluid to occur across said plunger;
- said force means comprising electromagnetic means fixed with said body and magnetizable material integral with said plunger;
- said sensing means comprising a coil responsive to change of magnetic flux linking it and thereby to generate a signal proportional to the rate of such change, and magnetizable material integral with said plunger, so disposed and arranged as to cause said flux linking said coil to change when said plunger moves.

6. A sensor according to claim 5 in which said plunger is moved by said force means to decrease said volume in said cavity.

7. A sensor according to claim 5 in which said plunger is moved by said force means to increase said volume in said cavity.

8. A sensor according to claim 5 in which said fluid transfer passage means extends through said plunger.

* * * * *